US011332547B2

(12) United States Patent
Qiu et al.

(10) Patent No.: US 11,332,547 B2
(45) Date of Patent: May 17, 2022

(54) CROSSLINKED DEXTRAN AND CROSSLINKED DEXTRAN-POLY ALPHA-1,3-GLUCAN GRAFT COPOLYMERS

(71) Applicant: NUTRITION & BIOSCIENCES USA 4, INC., Rochester, NY (US)

(72) Inventors: Weiming Qiu, Wilmington, DE (US); Douglas J. Adelman, Wilmington, DE (US); Geraldine M. Direnzo, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 41 days.

(21) Appl. No.: 16/485,312

(22) PCT Filed: Feb. 13, 2018

(86) PCT No.: PCT/US2018/017907
§ 371 (c)(1),
(2) Date: Aug. 12, 2019

(87) PCT Pub. No.: WO2018/152074
PCT Pub. Date: Aug. 23, 2018

(65) Prior Publication Data
US 2019/0359734 A1    Nov. 28, 2019

Related U.S. Application Data

(60) Provisional application No. 62/459,800, filed on Feb. 16, 2017, provisional application No. 62/489,500, filed on Apr. 25, 2017.

(51) Int. Cl.
C08B 37/02    (2006.01)

(52) U.S. Cl.
CPC ................. C08B 37/0021 (2013.01)

(58) Field of Classification Search
CPC .... C08B 37/0009; C08B 37/0021; C08L 5/02
USPC ....................................................... 536/112
See application file for complete search history.

(56) References Cited

U.S. PATENT DOCUMENTS

| | | |
|---|---|---|
| 2,627,858 A | 2/1953 | Miller |
| 2,639,239 A | 5/1953 | Elliott |
| 3,187,747 A | 6/1965 | Burgeni et al. |
| 3,322,123 A | 5/1967 | Griswold et al. |
| 3,345,358 A | 10/1967 | Inkaar et al. |
| 3,585,998 A | 6/1971 | Hayford et al. |
| 3,749,094 A | 7/1973 | Duncan |
| 3,964,486 A | 6/1976 | Blaney |
| 4,079,739 A | 3/1978 | Whitehead |
| 4,397,644 A | 8/1983 | Matthews et al. |
| 4,462,917 A | 7/1984 | Conway |
| 4,464,270 A | 8/1984 | Hollenbeak et al. |
| 4,477,360 A | 10/1984 | Almond |
| 4,623,339 A | 11/1986 | Ciraldo et al. |
| 4,762,521 A | 8/1988 | Roessler et al. |
| 4,781,713 A | 11/1988 | Welch et al. |
| 4,799,550 A | 1/1989 | Harris et al. |
| 4,840,734 A | 6/1989 | Johnson |
| 4,846,824 A | 7/1989 | Lassen et al. |
| 4,865,855 A | 9/1989 | Hansen et al. |
| 4,894,179 A | 1/1990 | Santori et al. |
| 4,925,453 A | 5/1990 | Kannankeril |
| 5,176,930 A | 1/1993 | Kannankeril et al. |
| 5,342,343 A | 8/1994 | Kitaoka et al. |
| 5,342,543 A | 8/1994 | Morris et al. |
| 5,456,733 A | 10/1995 | Hamilton, Jr. |
| 5,462,539 A | 10/1995 | Herman et al. |
| 5,462,972 A | 10/1995 | Smith et al. |
| 5,683,813 A | 11/1997 | Davis |
| 5,701,617 A | 12/1997 | Colby |
| 5,820,619 A | 10/1998 | Chen |
| 5,849,210 A | 12/1998 | Pascente et al. |
| 5,906,952 A | 5/1999 | Everaere et al. |
| 6,183,456 B1 | 2/2001 | Brown et al. |
| 6,191,341 B1 | 2/2001 | Shippert |
| 6,579,273 B2 | 6/2003 | Dupuy |
| 6,695,138 B1 | 2/2004 | Colombo et al. |
| 6,821,331 B2 | 11/2004 | Damodaran |
| 7,459,501 B2 | 12/2008 | Doane et al. |
| 7,531,073 B2 | 5/2009 | Barron et al. |
| 7,567,739 B2 | 7/2009 | Overton et al. |
| 7,670,513 B2 | 3/2010 | Erdner et al. |
| 7,732,657 B2 | 6/2010 | Hammons et al. |
| 7,871,640 B2 | 1/2011 | Flohr et al. |
| 8,361,926 B2 | 1/2013 | Tian et al. |
| 8,486,855 B2 | 7/2013 | Tian et al. |
| 8,859,758 B2 | 10/2014 | Frank et al. |

(Continued)

FOREIGN PATENT DOCUMENTS

| | | |
|---|---|---|
| JP | H05227965 A1 | 5/1998 |
| WO | 199846159 A1 | 10/1998 |
| WO | 199937261 A1 | 7/1999 |
| WO | 2003008618 A2 | 1/2003 |
| WO | 2015109064 A1 | 7/2015 |
| WO | 2015119859 A1 | 8/2015 |
| WO | 2017079595 A1 | 5/2017 |
| WO | WO 2017/079595 A1 * 5/2017 ............. C08B 37/02 |
| WO | WO 2017/079595 A1 * 11/2017 ............. C08B 37/02 |

OTHER PUBLICATIONS

Dinu et al, Cellulose Chemistry and Technology, 2011, 45 (3-4), 197-203.*

(Continued)

*Primary Examiner* — Ganapathy Krishnan

(57) ABSTRACT

Compositions are disclosed herein comprising one or more crosslinked dextrans or crosslinked dextran-poly alpha-1,3-glucan graft copolymers. Further disclosed are processes for preparing such crosslinked materials, as well as their use in absorption applications.

19 Claims, 3 Drawing Sheets

(56) References Cited

U.S. PATENT DOCUMENTS

| | | |
|---|---|---|
| 8,912,383 B2 | 12/2014 | Schmidt-Forst et al. |
| 8,987,543 B1 | 3/2015 | Watson |
| 9,089,730 B2 | 7/2015 | Shalev et al. |
| 9,161,860 B2 | 10/2015 | Jensen et al. |
| 2001/0014797 A1 | 8/2001 | Suzuki et al. |
| 2002/0087138 A1 | 7/2002 | Osterdahl et al. |
| 2002/0147483 A1 | 10/2002 | Bumbarger et al. |
| 2003/0070232 A1 | 4/2003 | Diak/Ghanem |
| 2004/0074271 A1 | 4/2004 | Krysiak et al. |
| 2004/0128764 A1 | 7/2004 | McGrath et al. |
| 2004/0167491 A1 | 8/2004 | Mizutani |
| 2005/0008737 A1 | 1/2005 | Kwon |
| 2005/0256486 A1 | 11/2005 | Carasso et al. |
| 2006/0172048 A1 | 8/2006 | Etchells et al. |
| 2007/0287971 A1 | 12/2007 | Roe et al. |
| 2008/0112907 A1 | 5/2008 | Chan et al. |
| 2008/0199577 A1 | 8/2008 | Jensen et al. |
| 2009/0046274 A1 | 2/2009 | McHugh et al. |
| 2009/0204091 A1 | 8/2009 | Mizutani et al. |
| 2010/0003515 A1 | 1/2010 | Tanaka et al. |
| 2010/0241098 A1 | 9/2010 | Brownlee |
| 2011/0137277 A1 | 6/2011 | Hough et al. |
| 2012/0003321 A1 | 1/2012 | Peng et al. |
| 2012/0328723 A1 | 12/2012 | Savich et al. |
| 2013/0281949 A1 | 10/2013 | Periman |
| 2014/0087431 A1 | 3/2014 | Payne et al. |
| 2016/0122445 A1 | 5/2016 | Nambiar et al. |
| 2016/0175811 A1 | 6/2016 | Behabtu et al. |
| 2017/0002336 A1 | 1/2017 | Payne et al. |

OTHER PUBLICATIONS

Walker et al., 1986, Carb Research (from CL6500).
International Preliminary Report on Patentability dated Aug. 20, 2019 for PCT/US2018/017907.

* cited by examiner

US 11,332,547 B2

CROSSLINKED DEXTRAN AND CROSSLINKED DEXTRAN-POLY ALPHA-1,3-GLUCAN GRAFT COPOLYMERS

This application is the National Stage application of International Application No. PCT/US18/17907 (filed Feb. 13, 2018), which claims the benefit of U.S. Provisional Application Nos. 62/459,800 (filed Feb. 16, 2017) and 62/489,500 (filed Apr. 25, 2017), all of which prior applications are incorporated herein by reference in their entirety.

FIELD

This disclosure is in the field of polysaccharides. For example, this disclosure pertains to the production of dextran-poly alpha-1,3-glucan graft copolymers that are crosslinked, and use thereof in compositions having advantageous aqueous liquid absorption features.

BACKGROUND

Superabsorbent materials generally are capable of absorbing high amounts of aqueous liquid, typically equivalent to many times their own weight, and retaining aqueous liquid under elevated pressure. Absorbent products in which superabsorbent materials are commonly applied include diapers, training pants, adult incontinence products and feminine care products. The use of superabsorbent materials in these and other products increase their absorbent capacity while reducing their overall bulk.

Most superabsorbent materials used today are composed of crosslinked synthetic polymers, and are termed superabsorbent polymers (SAPs). These include, for example, polymers and co-polymers of acrylic acid or acrylamide. Despite their advantage of superabsorbency, most commercial SAPs have significant drawbacks, such as not being derivable from renewable sources and/or lacking sufficient biodegradability.

Certain polysaccharide compositions have been used in superabsorption applications, potentially taking advantage of the general renewability and biodegradability of these bio-derived components. For example, U.S. Pat. No. 3,345,358 describes gel-forming polysaccharide derivatives comprising carboxymethyl starch. As another example, highly swollen gel particles containing a water-soluble, alkali metal salt of carboxymethyl cellulose have been described in U.S. Pat. No. 2,639,239.

Despite these past advances, further development of polysaccharide-based compositions is desired for acquiring enhanced superabsorption function.

SUMMARY

In one embodiment, the disclosure concerns a composition comprising a crosslinked graft copolymer, wherein the graft copolymer portion of the crosslinked graft copolymer comprises: (i) a backbone comprising dextran, and (ii) poly alpha-1,3-glucan side chains comprising at least about 50% alpha-1,3-glucosidic linkages.

In another embodiment, the disclosure concerns a method of producing a crosslinked graft copolymer, the method comprising: (a) contacting at least a solvent, a crosslinking agent, and a graft copolymer, wherein the graft copolymer comprises: (i) a backbone comprising dextran, and (ii) poly alpha-1,3-glucan side chains comprising at least about 50% alpha-1,3-glucosidic linkages, whereby a crosslinked graft copolymer is produced; and (b) optionally, isolating the crosslinked graft copolymer produced in step (a).

In another embodiment, the disclosure concerns a composition comprising crosslinked dextran, wherein the dextran comprises: (i) about 87-93 wt % glucose linked at positions 1 and 6; (ii) about 0.1-1.2 wt % glucose linked at positions 1 and 3; (iii) about 0.1-0.7 wt % glucose linked at positions 1 and 4; (iv) about 7.7-8.6 wt % glucose linked at positions 1, 3 and 6; and (v) about 0.4-1.7 wt % glucose linked at: (a) positions 1, 2 and 6, or (b) positions 1, 4 and 6; wherein the weight-average molecular weight (Mw) of the dextran is about 50-200 million Daltons.

BRIEF DESCRIPTION OF THE DRAWINGS AND SEQUENCES

FIG. 1: Example of a portion of a dextran-poly alpha-1,3-glucan graft copolymer that can be used to prepare a crosslinked graft copolymer as presently disclosed. In this particular illustration, a poly alpha-1,3-glucan chain ("glucan graft") is synthesized by a glucosyltransferase enzyme (GTF) off of a pendant glucose that is alpha-1,4-linked to a dextran backbone.

FIG. 2: Graphical representation of an example of a dextran-poly alpha-1,3-glucan graft copolymer that can be used to prepare a crosslinked graft copolymer. The dextran backbone and poly alpha-1,3-glucan side chains are presented roughly to scale with each other. For example, the backbone can be about 1000 DPw, while each side chain can be about 1000 DPw.

FIG. 3. A graph illustrates the effect of starting dextran concentration (g/L) on the DPw of dextran-poly alpha-1,3-glucan graft copolymer produced in 2-hr and 24 hr-glucosyltransferase reactions. Refer to Example 2.

DETAILED DESCRIPTION

Figure 1:
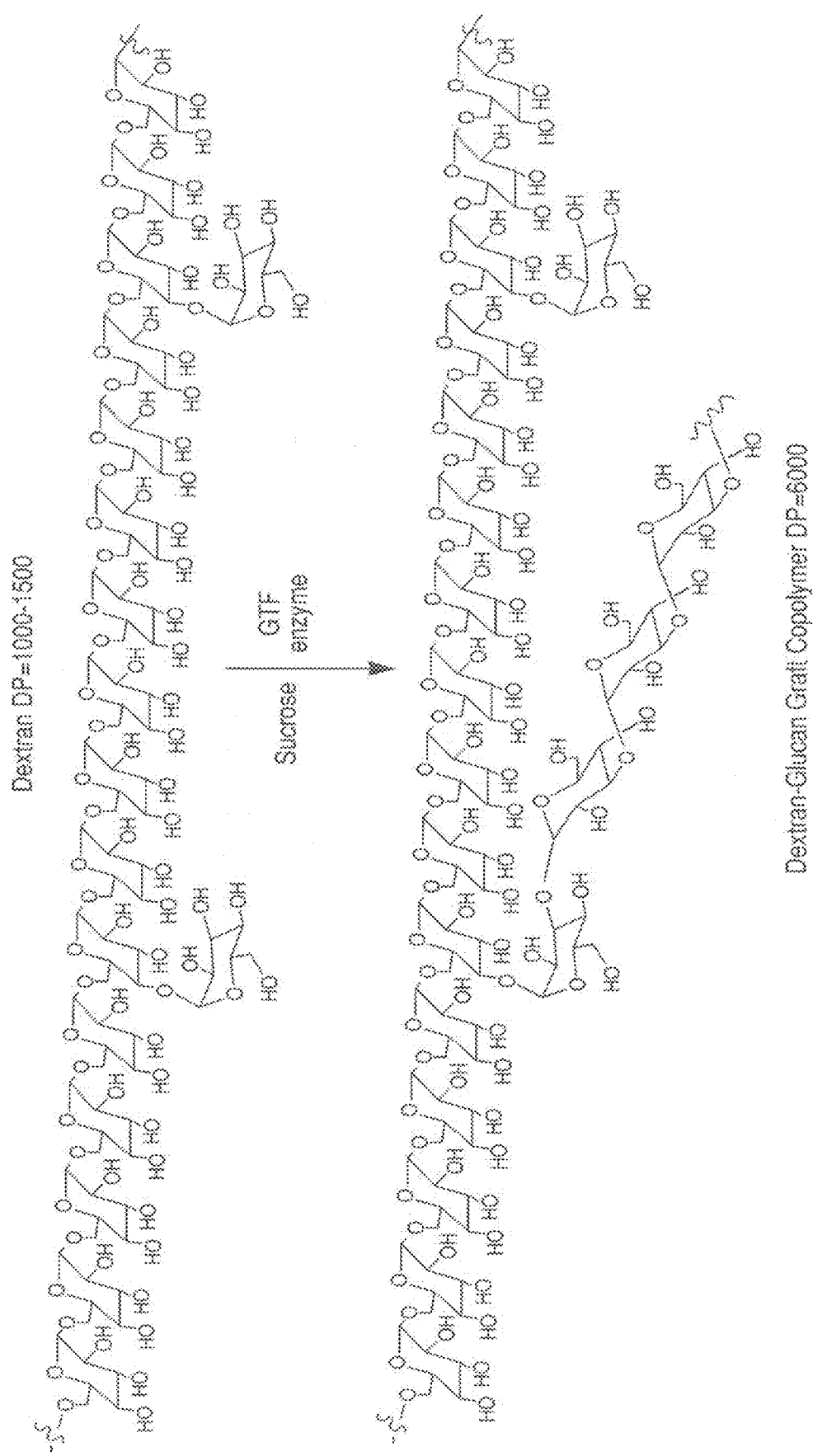

The disclosures of all cited patent and non-patent literature are incorporated herein by reference in their entirety.

Unless otherwise disclosed, the terms "a" and "an" as used herein are intended to encompass one or more (i.e., at least one) of a referenced feature.

Where present, all ranges are inclusive and combinable, except as otherwise noted. For example, when a range of "1 to 5" is recited, the recited range should be construed as including ranges "1 to 4", "1 to 3", "1-2", "1-2 & 4-5", "1-3 & 5", and the like. Any list of possible amounts/percentages herein can be used to describe a range, where a range can be set between any two amounts/percentages in the list.

The term "copolymer" herein refers to a polymer comprising at least two different types of alpha-glucan, such as dextran and poly alpha-1,3-glucan.

The terms "graft copolymer", "branched copolymer" and the like herein generally refer to a copolymer comprising a "backbone" (or "main chain") and side chains branching from the backbone. The side chains are structurally distinct from the backbone. Examples of graft copolymers herein are dextran-poly alpha-1,3-glucan graft copolymers, which comprise a backbone comprising dextran, and side chains of poly alpha-1,3-glucan. In some aspects, a dextran backbone can have a poly alpha-1,3-glucan extension, since the non-reducing end of dextran can prime poly alpha-1,3-glucan synthesis by a glucosyltransferase enzyme. A backbone can thus be a dextran-poly alpha-1,3-glucan linear copolymer in some instances. A backbone in some aspects can itself be a branched structure as disclosed below; the addition of poly alpha-1,3-glucan to such a backbone increases the branching of the original branched structure.

The term "crosslinked graft copolymer" and other like terms herein refer to a graft copolymer such as a crosslinked dextran-poly alpha-1,3-glucan graft copolymer. The term "crosslink" and other like terms herein typically refer to one or more bonds (covalent and/or non-covalent) that connect polymers. A crosslink having multiple bonds typically comprises one or more atoms that are part of a crosslinking agent that was used to form the crosslink. Non-covalent bonds in some aspects can be through ionic, hydrophobic, H-bonding, or van der Waals interactions.

The terms "crosslinking agent", "crosslinker" and the like herein refer to an atom or compound that can create crosslinks between glucan polymers (e.g., poly alpha-1,3-glucan, dextran). A crosslinking agent in typical embodiments have groups that can react with hydroxyl groups of glucose monomers of a graft copolymer.

The term "crosslinking reaction" and like terms (e.g., "crosslinking composition", "crosslinking preparation") herein typically refer to a reaction comprising at least a solvent, a crosslinking agent, and a graft copolymer. A crosslinking reaction in some aspects comprises an aqueous solvent such as water, whereas in other aspects the solvent is non-aqueous.

The terms "poly alpha-1,3-glucan side chain" and "poly alpha-1,3-glucan branch" (and like terms) can be used interchangeably herein. A poly alpha-1,3-glucan side chain is typically an extension of a dextran branch (e.g., pendant glucose or short chain), since a dextran branch has a non-reducing end that can prime poly alpha-1,3-glucan synthesis by a glucosyltransferase enzyme.

"Poly alpha-1,3-glucan homopolymer" and like terms as used herein refer to poly alpha-1,3-glucan that is not part of (i) a graft copolymer or (ii) a dextran-poly alpha-1,3-glucan linear copolymer.

The terms "alpha-glucan", "alpha-glucan polymer" and the like are used interchangeably herein. An alpha-glucan is a polymer comprising glucose monomeric units linked together by alpha-glucosidic linkages. Dextran and poly alpha-1,3-glucan are examples of alpha-glucans.

The terms "glycosidic linkage", "glycosidic bond" and the like are used interchangeably herein and refer to the covalent bond that joins a carbohydrate molecule to another carbohydrate molecule. The terms "glucosidic linkage", "glucosidic bond", "linkage" and the like are used interchangeably herein and refer to a glycosidic linkage between two glucose molecules. The term "alpha-1,6-glucosidic linkage" as used herein refers to the covalent bond that joins alpha-D-glucose molecules to each other through carbons 1 and 6 on adjacent alpha-D-glucose rings. This definition similarly applies to the terms "alpha-1,3-glucosidic linkage", "alpha-1,2-glucosidic linkage" and "alpha-1,4-glucosidic linkage", but using respective carbon numbers. Herein, "alpha-D-glucose" is referred to as "glucose" or "monomer". All glucosidic linkages disclosed herein are alpha-glucosidic linkages, except as otherwise noted.

The terms "poly alpha-1,3-glucan", "alpha-1,3-glucan polymer", "alpha-1,3-glucan" and the like are used interchangeably herein. Poly alpha-1,3-glucan comprises at least about 50% (e.g., ≥95%) alpha-1,3 linkages in certain aspects.

The terms "dextran", "dextran polymer", "dextran molecule" and the like are used interchangeably herein and refer to an alpha-glucan generally comprising a main chain with substantially (mostly) alpha-1,6-linked glucose monomers, typically with periodic branches linked to the main chain by alpha-1,3, alpha-1,2, and/or alpha-1,4 linkages.

A dextran main chain comprises more than about 90-95% of all the glucose monomers of a dextran polymer in some aspects. A dextran main chain in some instances can comprise substantially (or mostly) alpha-1,6 linkages, meaning that it can have at least about 98.0% alpha-1,6 linkages. A dextran main chain can comprise a small amount of alpha-1,3 linkages in some aspects, meaning that it can have less than about 2.0% alpha-1,3 linkages.

Dextran branches typically are short, being one (pendant) to three glucose monomers in length, and comprise less than about 10% of all the glucose monomers of a dextran polymer. Such short branches can comprise alpha-1,2, alpha-1,3, and/or alpha-1,4 linkages. Dextran in some embodiments can also have branches comprising mostly alpha-1,6 linkages; the length of such a branch can be similar to the length of the chain from which the branch originates.

The linkage profile of an alpha-glucan herein can be determined using any method known in the art. For example, a linkage profile can be determined using methods that use nuclear magnetic resonance (NMR) spectroscopy (e.g., $^{13}C$ NMR or $^{1}H$ NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

"Molecular weight" herein can be represented as number-average molecular weight (Mn) or as weight-average molecular weight (Mw), the units of which are in Daltons or grams/mole. Alternatively, molecular weight can be represented as DPw (weight average degree of polymerization) or DPn (number average degree of polymerization). The molecular weight of smaller alpha-glucan polymers typically can be provided as "DP" (degree of polymerization), which simply refers to the number of glucoses comprised within the alpha-glucan. Various means are known in the art for calculating these molecular weight measurements, such as with high-pressure liquid chromatography (HPLC), size exclusion chromatography (SEC), or gel permeation chromatography (GPC).

The terms "glucosyltransferase enzyme", "GTF enzyme", "GTF", "glucansucrase" and the like are used interchangeably herein. The activity of a glucosyltransferase herein catalyzes the reaction of the substrate sucrose to make the products alpha-glucan and fructose. Byproducts of a glucosyltransferase reaction can include glucose, various soluble gluco-oligosaccharides (DP2-DP7), and leucrose. Wild type forms of glucosyltransferase enzymes generally contain (in the N-terminal to C-terminal direction) a signal peptide, a variable domain, a catalytic domain, and a glucan-binding domain. A glucosyltransferase herein is classified under the glycoside hydrolase family 70 (GH70) according to the CAZy (Carbohydrate-Active EnZymes) database (Cantarel et al., *Nucleic Acids Res.* 37:D233-238, 2009). The term "dextransucrase" can optionally be used to characterize a glucosyltransferase enzyme that produces dextran.

The terms "enzymatic reaction" "glucosyltransferase reaction", "glucan synthesis reaction" and the like are used interchangeably herein and typically refer to a reaction that initially comprises at least water, sucrose, dextran and a glucosyltransferase enzyme. Such a reaction produces graft copolymer, which can then be crosslinked as presently disclosed.

The term "absorb" and like terms as used herein refers to the action of taking up (soaking up) an aqueous liquid. Absorption by a composition as presently disclosed can be measured in terms of water retention value (WRV) and/or centrifugal retention capacity (CRC) as disclosed herein, for example.

The terms "aqueous liquid", "aqueous fluid" and the like as used herein can refer to water or an aqueous solution. An "aqueous solution" herein can comprise one or more dissolved salts, where the maximal total salt concentration can be about 3.5 wt % in some embodiments. Although aqueous liquids herein typically comprise water as the only solvent in the liquid, an aqueous liquid can optionally comprise one or more other solvents (e.g., polar organic solvent) that are miscible in water. Thus, an aqueous solution can comprise a solvent having at least about 10 wt % water.

The term "household care product" and like terms typically refer to products, goods and services relating to the treatment, cleaning, caring, and/or conditioning of the home and its contents.

The term "personal care product" and like terms typically refer to products, goods and services relating to the treatment, cleaning, cleansing, caring, and/or conditioning of the person.

The term "medical product" and like terms typically refer to products, goods and services relating to the diagnosis, treatment, and/or care of patients.

The term "industrial product" and like terms typically refer to products, goods and services used in industrial settings, but not by individual consumers.

The terms "percent by volume", "volume percent", "vol %", "v/v %" and the like are used interchangeably herein. The percent by volume of a solute in a solution can be determined using the formula: [(volume of solute)/(volume of solution)]×100%.

The terms "percent by weight", "weight percentage (wt %)", "weight-weight percentage (% w/w)" and the like are used interchangeably herein. Percent by weight refers to the percentage of a material on a mass basis as it is comprised in a composition, mixture, or solution.

The terms "sequence identity", "identity" and the like as used herein with respect to a polypeptide amino acid sequence are as defined and determined in U.S. Pat. Appl. Publ. No. 2017/0002336, which is incorporated herein by reference.

A crosslinked graft copolymer or crosslinked dextran herein (and a reaction for synthesis thereof) can optionally be characterized as being "isolated", since it is synthetic/man-made, and/or has properties that are not naturally occurring.

Unless otherwise disclosed, the term "increased" as used herein can refer to a quantity or activity that is at least about 1%, 2%, 3%, 4%, 5%, 6%, 7%, 8%, 9%, 10%, 11%, 12%, 13%, 14%, 15%, 16%, 17%, 18%, 19%, 20%, 50%, 100%, or 200% more than the quantity or activity for which the increased quantity or activity is being compared. The terms "increased", "elevated", "enhanced", "greater than", "improved" and the like are used interchangeably herein.

Further development of polysaccharide-based compositions is desired for acquiring enhanced superabsorption function. Thus, to address this need, disclosed herein are, for example, dextran-alpha-1,3-glucan graft copolymers that, after enzymatic synthesis thereof, have been crosslinked. Various embodiments of such crosslinked graft copolymers have enhanced aqueous liquid absorption characteristics.

Certain embodiments of the present disclosure concern a composition comprising a crosslinked graft copolymer, wherein the graft copolymer portion of the crosslinked graft copolymer comprises:
  (i) a backbone comprising dextran, and
  (ii) poly alpha-1,3-glucan side chains comprising at least about 50% alpha-1,3-glucosidic linkages.

In typical embodiments, one or more crosslinks of a crosslinked graft copolymer are covalent (i.e., the graft copolymers are chemically crosslinked with each other). However, it is contemplated that one or more crosslinks can be non-covalent in some alternative embodiments. Crosslinks herein can be between at least two graft copolymer molecules (i.e., intermolecular crosslinks). It is contemplated that crosslinks in some embodiments can also be intramolecular, such as between separate poly alpha-1,3-glucan side chains of the same graft copolymer molecule, and/or between different sections of the dextran backbone of the same graft copolymer molecule.

A crosslink herein typically joins moieties via two or more covalent bonds. Such a crosslink can comprise, for example, at least a covalent bond to an oxygen atom (previously of a hydroxyl group before crosslinking) of a glucose monomer, and a covalent bond to an oxygen atom (previously of a hydroxyl group before crosslinking) of another glucose monomer. A crosslink joining moieties via two covalent bonds can have an atom ("crosslinking atom") that is bonded to (i) an oxygen atom of a glucose monomer, and (ii) an oxygen atom of another glucose monomer. A crosslinking atom(s) can optionally have one or more other bonds to other atom(s) (e.g., hydrogen, oxygen) that typically are derived from the crosslinking agent used to create the crosslink. For example, if phosphoryl chloride ($POCl_3$, also known as phosphorus oxychloride) or sodium trimetaphosphate (STMP) is used to create a crosslink, such a crosslink can optionally be characterized as having a phosphorus atom as a single crosslinking atom; aside from its two covalent bonds to oxygens of the glucose monomers being linked, the phosphorus atom is also bonded to an oxygen via a double-bond and another oxygen via a single bond. A crosslinker in some embodiments can have two or more (e.g., 3, 4, 5, 6, 7, 8 or more) crosslinking atoms; the number of covalent bonds that effectively link moieties in these embodiments increases accordingly with the number of crosslinking atoms.

One or more crosslinks of a crosslinked graft copolymer can comprise phosphorus in some aspects of the present disclosure. An example of such a crosslink is a phosphodiester bond. A phosphodiester bond herein typically is formed between hydroxyl groups of glucose monomers. For example, a phosphodiester bond can be formed between a hydroxyl group of a glucose monomer within a first graft copolymer and a hydroxyl group of a glucose monomer within a second graft copolymer (such linkage is intermolecular in this example). A crosslinking agent that can be used herein to prepare a crosslink comprising a phosphodiester bond can be $POCl_3$, for example. In some aspects, a crosslinking agent that can be used to prepare a crosslink comprising phosphorus can include $POCl_3$, polyphosphate, or STMP.

As described above, a crosslink herein can be prepared using $POCl_3$, polyphosphate, or STMP as a crosslinking agent, for example. Other examples of suitable crosslinking agents include boron-containing compounds (e.g., boric acid, diborates, tetraborates such as tetraborate decahydrate, pentaborates, polymeric compounds such as Polybor®, alkali borates), polyvalent metals (e.g., titanium-containing compounds such as titanium ammonium lactate, titanium triethanolamine, titanium acetylacetonate, or polyhydroxy complexes of titanium; zirconium-containing compounds such as zirconium lactate, zirconium carbonate, zirconium acetylacetonate, zirconium triethanolamine, zirconium diisopropylamine lactate, or polyhydroxy complexes of zirconium), glyoxal, glutaraldehyde, divinyl sulfone, epichlorohydrin, polycarboxylic acids (e.g., citric acid, malic acid, tartaric acid, succinic acid, glutaric acid, adipic acid), dichloro acetic acid, and polyamines. Still other examples of suitable crosslinking agents are described in U.S. Pat. Nos. 4,462,917, 4,464,270, 4,477,360 and 4,799,550, and U.S. Patent Appl. Publ. No. 2008/0112907, which are all incorporated herein by reference. A crosslinker in certain aspects can dissolve in an aqueous solvent herein. Yet in some aspects, a crosslinking agent is not a boron-containing compound (e.g., as described above).

A crosslink in certain aspects herein can involve (e.g., be prepared from) a carboxyl group that may have been derivatized onto a glucose monomer. A graft copolymer can in certain aspects comprise added carboxyl groups for utilization in such crosslinking chemistry. Yet, in some aspects, a crosslinked graft copolymer does not comprise a crosslink based on this chemistry.

A crosslinked graft copolymer can in some aspects be surface-crosslinked following initial crosslinking (crosslinked at the polymer surface). Examples of surface-crosslinking schemes herein include using a polyhydroxyl compound (e.g., polyvinyl alcohol) and/or using carboxymethyl cellulose (CMC) plus a crosslinker (e.g., epichlorohydrin, STMP, phosphoric acid, aminopropyl siloxanes). Surface-crosslinking can optionally involve (e.g., be prepared from), for example, a carboxyl group that may have been derivatized onto a glucose monomer and/or a carboxyl group that may have been introduced during the initial crosslinking. Surface-crosslinking herein can incorporate an agent and/or process as disclosed in any of U.S. Pat. Nos. 5,462,972, 6,821,331, 7,871,640, 8,361,926, or 8486855, which are all incorporated herein by reference. Yet, in some aspects, a crosslinked graft copolymer is not surface-crosslinked.

Aside from any effects from crosslinking itself, a crosslinked graft copolymer typically has not been derivatized (e.g., not etherified, esterified, oxidized), nor has a graft copolymer (used to produce the crosslinked graft copolymer) typically been derivatized.

A crosslinked graft copolymer herein can comprise a homogenous or heterogenous graft copolymer component. A crosslinked graft copolymer with a homogenous graft copolymer component can be prepared using one form, lot, or preparation of graft copolymer, for example, such as that made in a particular enzymatic reaction. A crosslinked graft copolymer with a heterogenous graft copolymer component typically is prepared using two or more different forms, lots, or preparations of graft copolymer, for example, such as ones made in different enzymatic reactions. For example, graft copolymers respectively comprising about 60 wt % dextran or 90 wt % dextran could be crosslinked to form a crosslinked graft copolymer with a heterogenous graft copolymer component.

A crosslinked graft copolymer in some embodiments can further comprise poly alpha-1,3 glucan homopolymer that is not glucosidically linked to a dextran backbone. Such embodiments can result from the co-production of free, non-primed poly alpha-1,3-glucan during enzymatic synthesis of a dextran/poly-alpha-1,3-glucan graft copolymer (the latter of which results from alpha-1,3-glucan synthesis off of dextran primer). Such free poly alpha-1,3 glucan homopolymer can be chemically crosslinked within these embodiments (e.g., crosslinked with graft copolymer), and can be of any Mw as disclosed herein for poly alpha-1,3 glucan side chains, for example.

A crosslinked graft copolymer as presently disclosed is typically insoluble under aqueous conditions (aqueous insoluble). For example, a crosslinked graft copolymer can be insoluble or not completely dissolved in water or another aqueous composition at a temperature up to about 50, 60, 70, 80, 90, 100, 110, or 120° C. An aqueous composition herein such as an aqueous solution can comprise a solvent having at least about 10 wt % water. In some embodiments, a solvent is at least about 20, 30, 40, 50, 60, 70, 80, 90, or 100 wt % water (or any integer value between 10 and 100 wt %), for example. In some embodiments, the pH of an aqueous solution is between 4 and 9.

The degree of crosslinking of a crosslinked graft copolymer in some aspects can be determined using the following formula (expressed as a percentage): [(total number of reactive groups in crosslinking agent used)/(total number of disaccharide units in the graft copolymer molecules)]×100. The degree of crosslinking in some aspects is contemplated to be between about 0.5%-70%, 0.5%-50%, 2.5%-70%, 2.5%-50%, 5%-70%, or 5%-50%, for example. The degree of crosslinking can be modified accordingly by altering the level of crosslinking agent used, for example.

A dextran forming the backbone of a graft copolymer portion of a crosslinked graft copolymer herein can comprise, for example, about, or at least about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% alpha-1,6-glucosidic linkages. Such a percent alpha-1,6 linkage profile takes into account the total of all linkages in the dextran (main chain and branch portions combined). "Dextran branches" and like terms herein are meant to encompass any branches that exist in a dextran polymer prior to its use to prepare a graft copolymer. In some embodiments, a dextran comprises a main chain comprising about, or at least about, 90%, 91%, 92%, 93%, 94%, 95%, 96%, 97%, 98%, 99%, or 100% alpha-1,6-glucosidic linkages. In some embodiments, the dextran is completely linear (100% alpha-1,6-glucosidic linkages).

A dextran herein can comprise, for example, about, or at least about, 1%, 2%, 3%, 4%, 5%, 6%, 7%, 8%, 9%, 10%, 11%, 12%, 13%, 14%, 15%, 16%, 17%, 18%, 19%, or 20% alpha-1,4, alpha-1,3 and/or alpha-1,2 glucosidic linkages. Typically, such linkages exist entirely, or almost entirely, in branch portions of the dextran, including branch points. In some embodiments, dextran branches may comprise one, two (e.g., alpha-1,4 and alpha-1,3; alpha-1,4 and alpha-1,2; alpha-1,3 and alpha-1,2), or all three of these types of linkages. The total percentage of alpha-1,4, alpha-1,3 and/or alpha-1,2 glucosidic linkages in a dextran herein is typically not greater than 50%. In some aspects, such as with dextran comprising a main chain having about, or at least about, 90%, 91%, 92%, 93%, 94%, 95%, 96%, 97%, 98%, 99%, or 100% alpha-1,6-glucosidic linkages, such dextran comprises about, or at least about, or less than about, 1%, 2%, 3%, 4%, 5%, 6%, 7%, 8%, 9%, or 10% alpha-1,4, alpha-1,3 and/or alpha-1,2 glucosidic linkages.

A branch point of a dextran herein can comprise an alpha-1,4, alpha-1,3, or alpha-1,2 glucosidic linkage (e.g., a branch may be alpha-1,3-linked to a dextran main chain). In some embodiments, all three of these branch points may exist, whereas in some embodiments only one or two (e.g., alpha-1,4 and alpha-1,3; alpha-1,4 and alpha-1,2; alpha-1,3 and alpha-1,2) types of these branch points exist. It is contemplated that a branch point occurs on average every (or at least about every) 5, 10, 15, 20, 25, 30, 35, 40, 45, 50, 10 to 30, 15 to 25, 20 to 30, or 20 to 40 glucose units of a dextran main chain, for example. Branches of a dextran molecule comprising alpha-1,4, alpha-1,3, and/or alpha-1,2 glucosidic linkages herein typically are one to three glucose monomers in length and comprise less than about 5-10% of all the glucose monomers of a dextran polymer. A branch comprising one glucose unit can be optionally be referred to as a pendant glucose group. In some embodiments, the branches of a dextran molecule can comprise about, or less than about, 10%, 9%, 8%, 7%, 6%, 5%, 4%, 3%, 2%, or 1% of all the glucose monomers of a dextran molecule. A dextran in certain embodiments can have about 1%, 2%, 3%, 4%, 5%, 6%, 7%, 8%, 9%, or 10% branch points as a percent of the glucosidic linkages in the polymer. The glucosidic linkage profile of a branch herein can optionally be characterized to include the glucosidic linkage by which the branch is linked to another chain.

A backbone of a graft copolymer in certain embodiments can be comprised entirely of a dextran as presently disclosed. However, in some aspects, a backbone can comprise other elements. For example, a graft copolymer backbone can comprise poly alpha-1,3-glucan originating from the non-reducing side of a dextran main chain, by virtue of the main chain (at its non-reducing end) serving to prime poly alpha-1,3-glucan synthesis during synthesis of the graft copolymer.

The molecular weight (Mw [weight-average molecular weight]) of a dextran herein can be about, or at least about, or less than about, 1000, 2000, 5000, 10000, 25000, 40000, 50000, 75000, 100000, 125000, 150000, 175000, 200000, 240000, 250000, 500000, 750000, or 1000000 Daltons, or be in a range of about 100000-200000, 125000-175000, 130000-170000, 135000-165000, 140000-160000, or 145000-155000 Daltons, for example. In some aspects, dextran can have a Mw of about, or at least about, or less than about, 2, 3, 4, 5, 6, 7, 8, 9, 10, 20, 30, 40, 50, 60, 70, 80, 90, 100, 110, 120, 130, 140, 150, 160, 170, 180, 190, or 200 million Daltons, or which is in a range of about 10-80, 20-70, 30-60, 40-50, 50-200, 60-200, 70-200, 80-200, 90-200, 100-200, 110-200, 120-200, 50-180, 60-180, 70-180, 80-180, 90-180, 100-180, 110-180, 120-180, 50-160, 60-160, 70-160, 80-160, 90-160, 100-160, 110-160, 120-160, 50-140, 60-140, 70-140, 80-140, 90-140, 100-140, 110-140, 120-140, 50-120, 60-120, 70-120, 80-120, 90-120, 90-110, 100-120, 110-120, 50-110, 60-110, 70-110, 80-110, 90-110, 100-110, 50-100, 60-100, 70-100, 80-100, 90-100, or 95-105 million Daltons.

Dextran with a Mw of at least about 50 million Daltons (e.g., 50-200 million Daltons) herein can optionally be referred to as a "very large dextran" or "very high molecular weight dextran". The Mw of dextran in some aspects is not below 100000 Daltons, and thus is not T10 (Mw=10000), T25 (Mw=25000), or T40 (Mw=40000) dextran, for example. Any dextran Mw herein can optionally be expressed as weight-average degree of polymerization (DPw), which is Mw divided by 162.14.

A very large dextran in some aspects can comprise (i) about 87-93 wt % glucose linked only at positions 1 and 6; (ii) about 0.1-1.2 wt % glucose linked only at positions 1 and 3; (iii) about 0.1-0.7 wt % glucose linked only at positions 1 and 4; (iv) about 7.7-8.6 wt % glucose linked only at positions 1, 3 and 6; and (v) about 0.4-1.7 wt % glucose linked only at: (a) positions 1, 2 and 6, or (b) positions 1, 4 and 6. In certain embodiments, a dextran can comprise (i) about 89.5-90.5 wt % glucose linked only at positions 1 and 6; (ii) about 0.4-0.9 wt % glucose linked only at positions 1 and 3; (iii) about 0.3-0.5 wt % glucose linked only at positions 1 and 4; (iv) about 8.0-8.3 wt % glucose linked only at positions 1, 3 and 6; and (v) about 0.7-1.4 wt % glucose linked only at: (a) positions 1, 2 and 6, or (b) positions 1, 4 and 6. Suitable examples of very large dextran herein are described in Examples 5 and 6 below.

A very large dextran in some aspects can comprise about 87, 87.5, 88, 88.5, 89, 89.5, 90, 90.5, 91, 91.5, 92, 92.5, or 93 wt % glucose linked only at positions 1 and 6. There can be about 87-92.5, 87-92, 87-91.5, 87-91, 87-90.5, 87-90, 87.5-92.5, 87.5-92, 87.5-91.5, 87.5-91, 87.5-90.5, 87.5-90, 88-92.5, 88-92, 88-91.5, 88-91, 88-90.5, 88-90, 88.5-92.5, 88.5-92, 88.5-91.5, 88.5-91, 88.5-90.5, 88.5-90, 89-92.5, 89-92, 89-91.5, 89-91, 89-90.5, 89-90, 89.5-92.5, 89.5-92, 89.5-91.5, 89.5-91, or 89.5-90.5 wt % glucose linked only at positions 1 and 6, in some instances.

A very large dextran in some aspects can comprise about 0.1, 0.2, 0.3, 0.4, 0.5, 0.6, 0.7, 0.8, 0.9, 1.0, 1.1, or 1.2 wt % glucose linked only at positions 1 and 3. There can be about 0.1-1.2, 0.1-1.0, 0.1-0.8, 0.3-1.2, 0.3-1.0, 0.3-0.8, 0.4-1.2, 0.4-1.0, 0.4-0.8, 0.5-1.2, 0.5-1.0, 0.5-0.8, 0.6-1.2, 0.6-1.0, or 0.6-0.8 wt % glucose linked only at positions 1 and 3, in some instances.

A very large dextran in some aspects can comprise about 0.1, 0.2, 0.3, 0.4, 0.5, 0.6, or 0.7 wt % glucose linked only at positions 1 and 4. There can be about 0.1-0.7, 0.1-0.6, 0.1-0.5, 0.1-0.4, 0.2-0.7, 0.2-0.6, 0.2-0.5, 0.2-0.4, 0.3-0.7, 0.3-0.6, 0.3-0.5, or 0.3-0.4 wt % glucose linked only at positions 1 and 4, in some instances.

A very large dextran in some aspects can comprise about 7.7, 7.8, 7.9, 8.0, 8.1, 8.2, 8.3, 8.4, 8.5, or 8.6 wt % glucose linked only at positions 1, 3 and 6. There can be about 7.7-8.6, 7.7-8.5, 7.7-8.4, 7.7-8.3, 7.7-8.2, 7.8-8.6, 7.8-8.5, 7.8-8.4, 7.8-8.3, 7.8-8.2, 7.9-8.6, 7.9-8.5, 7.9-8.4, 7.9-8.3, 7.9-8.2, 8.0-8.6, 8.0-8.5, 8.0-8.4, 8.0-8.3, 8.0-8.2, 8.1-8.6, 8.1-8.5, 8.1-8.1, 8.1-8.3, or 8.1-8.2 wt % glucose linked only at positions 1, 3 and 6, in some instances.

A very large dextran in some aspects can comprise about 0.4, 0.5, 0.6, 0.7, 0.8, 0.9, 1.0, 1.1, 1.2, 1.3, 1.4, 1.5, 1.6, or 1.7 wt % glucose linked only at (a) positions 1, 2 and 6, or (b) positions 1, 4 and 6. There can be about 0.4-1.7, 0.4-1.6, 0.4-1.5, 0.4-1.4, 0.4-1.3, 0.5-1.7, 0.5-1.6, 0.5-1.5, 0.5-1.4, 0.5-1.3, 0.6-1.7, 0.6-1.6, 0.6-1.5, 0.6-1.4, 0.6-1.3, 0.7-1.7, 0.7-1.6, 0.7-1.5, 0.7-1.4, 0.7-1.3, 0.8-1.7, 0.8-1.6, 0.8-1.5, 0.8-1.4, 0.8-1.3 wt % glucose linked only at (a) positions 1, 2 and 6, or (b) positions 1, 4 and 6, in some instances.

"Glucose (glucose monomers) linked at positions 1 and 6" herein refers to a glucose monomer of dextran in which only carbons 1 and 6 of the glucose monomer are involved in respective glucosidic linkages with two adjacent glucose monomers. This definition likewise applies to glucose (i) "linked at positions 1 and 3", and (ii) "linked at positions 1 and 4", taking into account, accordingly, the different carbon positions involved in each respective linkage. "Glucose (glucose monomers) linked at positions 1, 3 and 6" herein refers to a glucose monomer of dextran in which carbons 1, 3 and 6 of the glucose monomer are involved in respective glucosidic linkages with three adjacent glucose monomers. A glucose linked only at positions 1, 3 and 6 is a branch point. This definition likewise applies to glucose linked at (i) positions 1, 2 and 6, and (ii) positions 1, 4 and 6, but taking into account, accordingly, the different carbon positions involved in each respective linkage. Glucose positions (glucose carbon positions) 1, 2, 3, 4 and 6 herein are as known in the art (depicted in the following structure):

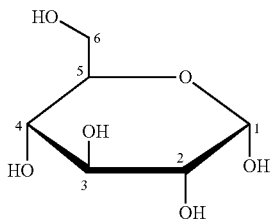

The glucosidic linkage profile of a very large dextran can be determined using dextran produced following any protocol disclosed herein. An example of a suitable linkage determination protocol can be similar to, or the same as, the protocols disclosed in U.S. Appl. Publ. No. 2016/0122445 (e.g., para. 97 or Example 9 therein), which is incorporated herein by reference.

It is believed that very large dextran herein can be a branched structure in which there are long chains (containing mostly or all alpha-1,6-linkages) that iteratively branch from each other (e.g., a long chain can be a branch from another long chain, which in turn can itself be a branch from another long chain, and so on). The branched structure may also comprise short branches from the long chains; these short chains are believed to mostly comprise alpha-1,3 and -1,4 linkages, for example. Branch points in the very large dextran, whether from a long chain branching from another long chain, or a short chain branching from a long chain, appear to comprise alpha-1,3, -1,4, or -1,2 linkages off of a glucose involved in alpha-1,6 linkage. On average, about 20%, 21%, 22%, 23%, 24%, 25%, 26%, 27%, 28%, 29%, 30%, 15-35%, 15-30%, 15-25%, 15-20%, 20-35%, 20-30%, 20-25%, 25-35%, or 25-30% of all branch points of very large dextran in some embodiments branch into long chains. Most (>98% or 99%) or all the other branch points branch into short chains.

The long chains of a very large dextran branching structure can be similar in length in some aspects. By being similar in length, it is meant that the individual length (DP) of at least 70%, 75%, 80%, 85%, or 90% of all the long chains in a branching structure is within plus/minus 15% (or 10%, 5%) of the mean length of all the long chains of the branching structure. In some aspects, the mean length (average length) of the long chains of a very large dextran is about 10-50 DP (i.e., 10-50 glucose monomers). For example, the mean individual length of the long chains can be about 10, 15, 16, 17, 18, 19, 20, 21, 22, 23, 24, 25, 30, 35, 40, 45, 50, 10-50, 10-40, 10-30, 10-25, 10-20, 15-50, 15-40, 15-30, 15-25, 15-20, 20-50, 20-40, 20-30, or 20-25 DP.

Long chains in certain embodiments of very large dextran can comprise substantially alpha-1,6-glucosidic linkages and a small amount (less than 2.0%) of alpha-1,3- and/or alpha-1,4-glucosidic linkages. For example, very large dextran long chains can comprise about, or at least about, 98%, 98.25%, 98.5%, 98.75%, 99%, 99.25%, 99.5%, 99.75%, or 99.9% alpha-1,6-glucosidic linkages. A dextran long chain in certain embodiments does not comprise alpha-1,4-glucosidic linkages (i.e., such a long chain has mostly alpha-1,6 linkages and a small amount of alpha-1,3 linkages). Conversely, a dextran long chain in some embodiments does not comprise alpha-1,3-glucosidic linkages (i.e., such a long chain has mostly alpha-1,6 linkages and a small amount of alpha-1,4 linkages). Any dextran long chain of the above embodiments may further not comprise alpha-1,2-glucosidic linkages, for example. Still in some aspects, a dextran long chain can comprise 100% alpha-1,6-glucosidic linkages (excepting the linkage used by such long chain to branch from another chain).

Short chains of a very large dextran molecule in some aspects are one to three glucose monomers in length and comprise less than about 5-10% of all the glucose monomers of the dextran polymer. At least about 90%, 91%, 92%, 93%, 94%, 95%, 96%, 97%, 98%, 99%, or all of, short chains herein are 1-3 glucose monomers in length. The short chains of a dextran molecule can comprise less than about 10%, 9%, 8%, 7%, 6%, 5%, 4%, 3%, 2%, or 1% of all the glucose monomers of a very large dextran molecule, for example.

Short chains of a very large dextran molecule in some aspects can comprise alpha-1,2-, alpha-1,3-, and/or alpha-1,4-glucosidic linkages. Short chains, when considered all together (not individually) may comprise (i) all three of these linkages, or (ii) alpha-1,3- and alpha-1,4-glucosidic linkages, for example.

Regarding a graft copolymer comprising very large dextran, it is contemplated that a "backbone" herein is a long chain of the very large dextran. A poly alpha-1,3-glucan side chain can be linked to a long chain of a very large dextran in a manner as presently disclosed throughout (e.g., extension from the non-reducing end of a short chain [e.g., pendant glucose] or of a long chain).

The Mw of a very large dextran herein is about 50-200 million, or any Mw as disclosed above for dextran falling within this range.

The z-average radius of gyration of a very large dextran herein can be about 200-280 nm. For example, the z-average Rg can be about 200, 205, 210, 215, 220, 225, 230, 235, 240, 245, 250, 255, 260, 265, 270, 275, or 280 nm (or any integer between 200-280 nm). As other examples, the z-average Rg can be about 200-280, 200-270, 200-260, 200-250, 200-240, 200-230, 220-280, 220-270, 220-260, 220-250, 220-240, 220-230, 230-280, 230-270, 230-260, 230-250, 230-240, 240-280, 240-270, 240-260, 240-250, 250-280, 250-270, or 250-260 nm.

The term "radius of gyration" (Rg) herein refers to the mean radius of dextran, and is calculated as the root-mean-square distance of a dextran molecule's components (atoms) from the molecule's center of gravity. Rg can be provided in Angstrom or nanometer (nm) units, for example. The "z-average radius of gyration" of dextran herein refers to the Rg of dextran as measured using light scattering (e.g., MALS). Methods for measuring z-average Rg are known and can be used herein, accordingly. For example, z-average Rg can be measured as disclosed in U.S. Pat. No. 7,531,073, U.S. Patent Appl. Publ. Nos. 2010/0003515 and 2009/0046274, Wyatt (Anal. Chim. Acta 272:1-40), and Mori and Barth (Size Exclusion Chromatography, Springer-Verlag, Berlin, 1999), all of which are incorporated herein by reference.

The Mw and/or z-average Rg of very large dextran in some aspects can be measured following a protocol similar to, or the same as, the protocols disclosed in U.S. Appl. Publ. No. 2016/0122445 (e.g., para. 105 or Example 9 therein), which is incorporated herein by reference.

A very large dextran herein can be enzymatically synthesized according to the disclosure of U.S. Appl. Publ. No. 2016/0122445, for example, which is incorporated herein by reference. For example, as described in this reference, such a dextran can be produced in a suitable reaction comprising GTF 0768, or a GTF comprising an amino acid sequence that is at least 90%, 91%, 92%, 93%, 94%, 95%, 96%, 97%, 98%, or 99% identical to the amino acid sequence of GTF 0768.

A graft copolymer portion of a crosslinked graft copolymer herein comprises a dextran backbone from which there are poly alpha-1,3-glucan side chains comprising at least about 50% alpha-1,3-glucosidic linkages. These side chains typically can be obtained via reacting a dextran as presently disclosed herein with a glucosyltransferase that can synthesize poly alpha-1,3-glucan. For clarity purposes, these side chains ought not be considered branches of dextran.

A poly alpha-1,3-glucan side chain in certain aspects can comprise about, or at least about, 50%, 51%, 52%, 53%, 54%, 55%, 56%, 57%, 58%, 59%, 60%, 61%, 62%, 63%, 64%, 65%, 66%, 67%, 69%, 70%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% alpha-1,3 glucosidic linkages. A side chain is contemplated in some aspects to be synthesized with a glucosyltransferase enzyme using a pendant glucose or other branch of dextran (both of which present non-reducing ends to the enzyme for extension) as a primer. Where a side chain is synthesized from a pendant glucose that is itself alpha-1,3-linked to the dextran main chain, the resulting side chain can have 100% or a very high (e.g., 98% or greater) percentage of alpha-1,3-glucosidic linkages. In some embodiments, the glucosidic linkage between a dextran main chain and a pendant glucose or longer branch is considered a linkage of the side chain. In some embodiments, the glucosidic linkage between a dextran main chain and a branch, as well as the glucosidic linkages within a branch from which a side chain was synthesized, are considered in determining the linkage profile of the side chain. In some alternative embodiments, a poly alpha-1,3-glucan side chain can comprise about, or at least about, 30% alpha-1,3 glucosidic linkages. The balance of linkages in any poly alpha-1,3-glucan side chain herein typically can be with alpha-1,6 linkages.

The Mw of a poly alpha-1,3-glucan side chain herein can be about, or at least about 1620, 1650, 1700, 2000, 5000, 10000, 15000, 16200, 20000, 25000, 30000, 40000, 50000, 60000, 70000, 75000, 80000, 90000, 100000, 110000, 120000, 125000, 130000, 140000, 150000, 160000, 162000, or 165000 Daltons, for example. It is contemplated that the side chains of a graft copolymer herein are relatively homogenous in size. For instance, the sides chains of a graft copolymer can each have a Mw in the range of about 150000-165000, 155000-165000, or 160000-165000 Daltons. The average Mw of the side chains of a graft copolymer can also be referred to, if desired; any of the foregoing side chain Mw's can be considered an average Mw of all the side chains of a copolymer. Any of the side chain Mw's (or any glucan Mw) disclosed herein can optionally be characterized in terms of DPw (i.e., Mw/162.14).

The number of poly alpha-1,3-glucan side chains of a graft copolymer herein can be, or can be at least, 3, 4, 5, 6, 7, 8, 9, 10, 11, 12, 13, 14, 15, 16, 17, 18, 19, 20, 21, 22, 23, 24, 25, 26, 27, 28, 29, or 30, for example. In some embodiments, the number of side chains is 4, 5, or 6, for example. The foregoing number of poly alpha-1,3-glucan side chains in some aspects is a characteristic of side chains that are at least about 100000, 120000, 140000, 160000, 162000, or 165000 Daltons. Still, in further aspects, the foregoing number of poly alpha-1,3-glucan side chains can characterize a graft copolymer in which the dextran component has a pendant glucose and/or branch (from which a side chain can be primed/synthesized) on average once every 15, 16, 17, 18, 19, 20, 21, 22, 23, 24, or 25 glucose units of a dextran main chain. Based on the size of a dextran component (e.g., 100000-200000 Daltons), the positioning of branches/pendant glucoses on the dextran main chain (e.g., about one every 20 glucose units), and the number of poly alpha-1,3-glucan side chains of a graft copolymer, it is contemplated in some cases that a graft copolymer has a majority (e.g., at least 80%, 85%, 90%, 95%) of its original dextran branches/pendant glucoses non-extended into a poly alpha-1,3-glucan side chain (i.e., most of the branches/pendant glucoses are as they existed in the dextran before use thereof to synthesize a graft copolymer). Still, in some other embodiments, it is believed possible that a graft copolymer herein can have up to about 50, 100, 500, 1000, 5000, 10000, 15000, or 20000 poly alpha-1,3-glucan side chains.

The Mw of a graft copolymer portion of a crosslinked graft copolymer herein (i.e., the combined Mw of the original dextran molecule and the poly alpha-1,3-glucan side chains of a graft copolymer) can be about, or at least about, 750000, 800000, 900000, 1000000, 1100000, 1200000, 1300000, 1400000, 1500000, 1600000, 1700000, 1800000, 1900000, or 2000000 Daltons, for example. The Mw of a graft copolymer that comprises a very large dextran component in some embodiments is believed to be similar to the weight as disclosed above for the very large dextran component itself, but with the addition of about 0.5, 0.75, 1, 1.25, 1.5, 1.75 or 2 million Daltons (in embodiments in which there are a few poly alpha-1,3-glucan side chains). The polydispersity index (Mw/Mn) (PDI) of a graft copolymer herein can be about, at least about, or less than about, 5.0, 4.75, 4.5, 4.25, 4.0, 3.75, 3.5, 3.25, 3.0, 2.75, 2.5, 2.25, or 2.0, for example.

In certain embodiments, a graft copolymer can comprise about, or at least about, 0.5, 1,2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99, 50-95, 60-95, 50-90, or 60-90 wt % one or more dextran compounds as disclosed herein.

A graft copolymer portion of a crosslinked graft copolymer herein can be produced using an enzymatic reaction as disclosed in International Appl. Publ. No. WO2017/079595 (Appl. No. PCT/US2016/060579), which is incorporated herein by reference, for example. Such an enzymatic reaction typically comprises at least: (i) water, (ii) sucrose, (iii) one or more dextran compounds as disclosed herein, and (iv) a glucosyltransferase enzyme that synthesizes poly alpha-1, 3-glucan. Poly alpha-1,3-glucan synthesis by a glucosyltransferase enzyme in this reaction can, in part at least, be via use of the dextran as a primer for poly alpha-1,3-glucan synthesis. Following enzymatic production of dextran-poly alpha-1,3-glucan graft copolymer, it can be chemically crosslinked to produce a crosslinked graft copolymer as presently disclosed.

The initial concentration of dextran in an enzymatic reaction for preparing graft copolymer herein can be about, or at least about, 0.5 g/L, 1.0 g/L, 1.5 g/L, 2 g/L, 2.5 g/L, 3 g/L, 4 g/L, 5 g/L, 7.5 g/L, 10 g/L, 15 g/L, 20 g/L, or 25 g/L, for example. "Initial concentration of dextran" refers to the dextran concentration in a glucosyltransferase reaction just after all the reaction components have been added (e.g., at least water, sucrose, dextran, glucosyltransferase enzyme). Dextran for entry into a reaction can be from a commercial source or prepared enzymatically, for example. Dextran produced enzymatically (e.g., using dextransucrase) can, in some aspects, be (i) isolated in some manner from an initial dextran synthesis enzymatic reaction (e.g., separated from a dextransucrase reaction) and then entered into an enzymatic reaction for alpha-1,3-glucan side chain synthesis, or (ii) entered into an enzymatic reaction for alpha-1,3-glucan side chain synthesis without being separated from an initial dextran synthesis enzymatic reaction (e.g., completed and/or heat-killed reaction is used directly for the alpha-1,3-glucan side chain synthesis reaction).

An enzymatic reaction for producing a graft copolymer typically comprises a glucosyltransferase enzyme that can synthesize poly alpha-1,3-glucan comprising at least about 30%, 35%, 40%, 45%, 50%, 55%, 60%, 65%, 70%, 75%, 80%, 85%, 90%, 95% alpha-1,3-glucosidic linkages. Such an enzyme can synthesize poly alpha-1,3-side chains (as disclosed above) from dextran primer sites, forming a dextran-poly alpha-1,3-glucan graft copolymer herein. In particular aspects, a glucosyltransferase enzyme can synthesize poly alpha-1,3-glucan that (i) comprises about 100%, or at least about 90%, 91%, 92%, 93%, 94%, 95%, 96%, 97%, 98%, or 99%, alpha-1,3-glucosidic linkages, and/or (ii) is at least about 16200 Daltons.

A glucosyltransferase enzyme in certain embodiments for producing poly alpha-1,3-glucan side chains can comprise, or consist of, an amino acid sequence as disclosed in U.S. Patent Appl. Publ. No. 2014/0087431, for example, which is incorporated herein by reference. Examples of such sequences include those that are 100% identical to, or at least 90%, 91%, 92%, 93%, 94%, 95%, 96%, 97%, 98%, 98.5%, 99%, or 99.5% identical to, SEQ ID NO:2, 4, 6, 8, 10, 12, 14, 16, 18, 20, 26, 28, 30, 34, or 59 as disclosed in U.S. Patent Appl. Publ. No. 2014/0087431, and have glucosyltransferase activity. A glucosyltransferase enzyme with SEQ ID NO:2, 4, 8, 10, 14, 20, 26, 28, 30, or 34 can synthesize poly alpha-1,3-glucan comprising at least about 90% alpha-1,3-glucosidic linkages in some aspects.

The temperature of an enzymatic reaction for producing a graft copolymer can be controlled, if desired. In certain embodiments, the temperature of a reaction can be between about 5° C. to about 50° C., about 20° C. to about 40° C., or about 20° C. to about 30° C. (e.g., about 22-25° C.). The pH of an enzymatic reaction in certain embodiments can be between about 4.0 to about 8.0, or between about 5.0 to about 6.0. Alternatively, the pH can be about 4.0, 4.5, 5.0, 5.5, 6.0, 6.5, 7.0, 7.5, or 8.0, for example. The pH can be adjusted or controlled by the addition or incorporation of a suitable buffer, including but not limited to: phosphate, tris, citrate, or a combination thereof. Buffer concentration in a glucan synthesis reaction can be from 0 mM to about 100 mM, or about 10, 20, or 50 mM, for example.

The initial concentration of sucrose in an enzymatic reaction for producing a graft copolymer can be about 20-400, 200-400, 250-350, 75-175, or 50-150 g/L, for example.

In some aspects, the initial concentration of sucrose can be about, or at least about, 40, 50, 60, 70, 80, 90, 100, 110, 120, 130, 140, 150, 160, 180, 200, 250, 300, or 400 g/L, for example. "Initial concentration of sucrose" refers to the sucrose concentration in a glucosyltransferase reaction just after all the reaction components have been added (e.g., at least water, sucrose, dextran, glucosyltransferase enzyme).

One or more glucosyltransferase enzymes may be used in an enzymatic reaction for producing a graft copolymer. An enzymatic reaction herein may contain one, two, or more glucosyltransferase enzymes, for example. In some aspects, only one or two glucosyltransferase enzymes is/are comprised in a reaction. A reaction composition herein can be, and typically is, cell-free (e.g., no whole cells present). A reaction composition can be contained within any vessel (e.g., an inert vessel/container) suitable for applying one or more reaction conditions disclosed herein. An inert vessel in some aspects can be of stainless steel, plastic, or glass (or comprise two or more of these components) and be of a size suitable to contain a particular reaction. Typically, the reaction time can be about 1, 2, 3, 4, 5, 10, 12, 24, 36, 48, 60, 72, 84, or 96 hours.

Following its enzymatic synthesis, a graft copolymer can be isolated (e.g., by filtration or centrifugation), if desired, prior to being crosslinked. In doing so, the graft copolymer is separated from most of the reaction solution, which may comprise water, fructose, residual sucrose and certain byproducts (e.g., leucrose, soluble oligosaccharides DP2-DP7, glucose). Isolation can optionally further comprise washing a graft copolymer product one, two, or more times with water or other aqueous liquid, and/or drying the product. Such washing can use wash volumes of about, or at least about, 0.5-, 1-, 1.5-, or 2-times the volume of the original reaction or of a product sample, and/or involve filtration and/or centrifugation, for example.

A crosslinked graft copolymer as presently disclosed can be produced, for example, by contacting a graft copolymer herein with at least a crosslinking agent and a solvent. This process step can optionally be characterized as contacting a graft copolymer with a crosslinking agent under aqueous conditions or non-aqueous conditions, depending on the solvent being used. Any crosslinking agent and/or graft copolymer disclosed herein can be employed accordingly. Any process parameter disclosed below and in the Examples can likewise be applied in these product-by-process embodiments.

Further disclosed herein is a method/process of producing a crosslinked graft copolymer. This method can comprise:
  (a) contacting at least a solvent, a crosslinking agent, and a graft copolymer as presently disclosed, whereby a crosslinked graft copolymer is produced, and
  (b) optionally, isolating the crosslinked graft copolymer produced in step (a).

Method step (a) can optionally be characterized as contacting a graft copolymer with a crosslinking agent under aqueous or non-aqueous conditions (depending on the solvent), and/or can optionally be characterized as a crosslinking reaction. Any crosslinking agent and/or graft copolymer disclosed herein can be employed in this method accordingly. In the contacting step of the above process and product-by-process embodiments, it is generally desired that such is conducted under conditions suitable for allowing the crosslinking agent to make a crosslink. It should be evident from the present disclosure that a graft copolymer itself, which is entered into a crosslinking reaction, typically is made enzymatically as disclosed herein without any chemical crosslinking.

A crosslinking reaction herein can be performed under aqueous conditions in certain aspects. For example, a reaction can be comprise, optionally as a first step, providing a preparation (typically a slurry or mixture) of at least one graft copolymer (e.g., any as disclosed herein) in an aqueous liquid (e.g., water). The wt % of graft copolymer in such a preparation can be about, or at least about, 1, 5, 10, 15, 20, 25, 30, 1-30, 1-25, 1-20, 1-15, 1-10, 1-5, 5-30, 5-25, 5-20, 5-15, 5-10, 10-30, 10-25, 10-20, or 10-15, for example (such a wt % can likewise be applied to a non-aqueous reaction, if desired). This preparation can optionally be incubated, preferably with agitation, for about, or at least about, 0.25, 0.50, 1, 2, 3, 4, 5, 6, 7, 8, 9, 10, 11, 12, 18, 24, or 48 hours, and/or be at room temperature of a temperature of about 15, 20, 25, 30, 35, 40, 50, 15-25, 15-30, 15-40, 15-50, 20-25, 20-30, 20-40, or 20-50° C. This preparation typically is made first without pH adjustment, but can optionally be prepared simultaneously with pH adjustment (below).

The pH of the aqueous preparation can in certain aspects be adjusted (increased or decreased) accordingly. For example, such as when using $POCl_3$ as a crosslinking agent, a base (e.g., sodium hydroxide [NaOH]) can be added to raise the pH to about 8, 8.5, 9, 9.5, 10, 10.5, 11, 11.5, 12, 8-12, 9-12, 10-12, 8-11.5, 9-11.5, or 10-11.5. A pH-adjusted preparation can optionally be incubated, preferably with agitation, for at least about 10, 15, 20, 25, 30, 45 or 60 minutes, and/or be at a temperature as listed above. Adjustment of pH is generally done before, but can optionally be done simultaneously with, addition of a crosslinking agent (below). Increasing pH in some aspects can partially or completely dissolve a graft copolymer.

A crosslinking agent (e.g., any as disclosed herein that can dissolve in aqueous conditions) is dissolved in the preparation, typically following pH-adjustment. The concentration of the crosslinking agent in the resulting preparation can be about, or at least about, 0.2, 0.4, 0.5, 1, 1.5, 1.6, 1.7, 2, 4, 6, 8, 10, 0.5-2, 1-2, 1.5-2, or 1.5-1.7 wt %, for example (such a wt % can likewise be applied to a non-aqueous reaction, if desired). Agitation (e.g., shaking or stirring) is typically applied while dissolving the crosslinking agent. This preparation is typically incubated, preferably with agitation, for at least about 0.25, 0.50, 1, 2, 3, 4, or 5 hours, and/or be at a temperature as listed above.

A crosslinking reaction, if pH-adjusted, can optionally be neutralized upon completion (e.g., using HCl if pH had been increased), or neutralized while isolating the crosslinked graft copolymer product of the reaction. Neutralization typically brings a pH around 7.0 (e.g., 6.0-8.0, 6.5-7.5, 6.8-7.2).

The aforementioned conditions/parameters for performing a crosslinking reaction can be adjusted accordingly, depending on the type of crosslinker being employed, for example.

A crosslinked graft copolymer produced in a crosslinking reaction herein can optionally be isolated. For example, a crosslinked product can be separated by filtration or centrifugation (or any other method known in the art for removal of liquids from solids) from the reaction/post-reaction liquid. Isolation can optionally further comprise washing a crosslinked product one, two, or more times with water or other aqueous liquid, and/or drying the product. Washing in some aspects can be done such that no salts (e.g., NaCl) can be detected in the washed product. Drying in some aspects can be performed using any method known in the art, such as vacuum drying, air drying, or freeze drying. Drying can optionally be performed at a temperature of at least about 70, 80, 90, or 70-90° C. Dried product can be made into a particulate form, if desired, such as through crushing and/or grinding.

The percent yield of a crosslinked graft copolymer product of a crosslinking reaction herein can be about, or at least about, 20%, 25%, 30%, 35%, 40%, 45%, 50%, 55%, 60%, 65%, 70%, 75%, 80%, 85%, 90%, or 95%, for example. Percent yield of a crosslinked graft copolymer can be measured, for instance, by dividing the actual product yield by the theoretical product yield, and multiplying by 100%.

A crosslinked graft copolymer as comprised in a composition herein can absorb an aqueous liquid. An aqueous liquid can be water for instance. An aqueous liquid in certain aspects can be an aqueous solution, such as a salt solution (saline solution). A salt solution can optionally comprise about, or at least about, 0.01, 0.025, 0.05, 0.075, 0.1, 0.25, 0.5, 0.75, 0.9, 1.0, 1.25, 1.5, 1.75, 2.0, 2.5, 3.0, 0.5-1.5, 0.5-1.25, 0.5-1.0, 0.75-1.5, 0.75-1.25, or 0.75-1.0 wt % of salt (such wt % values typically refer to the total concentration of one or more salts). Examples of a salt that can be used in an aqueous solution herein include one or more sodium salts (e.g., NaCl, $Na_2SO_4$). Other non-limiting examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in an aqueous liquid as presently disclosed, for example.

Absorption of an aqueous liquid by a crosslinked graft copolymer as comprised in a composition herein can be gauged by measuring the water retention value (WRV) of the crosslinked graft copolymer, for example. WRV herein can be measured by any means known in the art, such as via the methodology disclosed in U.S. Patent Appl. Publ. No. 2016/0175811 (e.g., Example 7 therein), which is incorporated herein by reference. Briefly, WRV can be calculated using the following formula: ((mass of wet crosslinked graft copolymer−mass of dry crosslinked graft copolymer)/mass of dry crosslinked graft copolymer)*100. WRV can be measured with respect to any aqueous liquid as presently disclosed, for example. Thus, while the term WRV contains the word "water", it would be understood that WRV can be measured with regard to any type of aqueous liquid disclosed herein, such as an aqueous solution.

A crosslinked graft copolymer as comprised in a composition herein can have a WRV of about, or at least about, 400 in some embodiments. For instance, WRV herein can be about, or at least about, 400, 500, 600, 700, 800, 900, 1000, 1250, 1500, 1750, 2000, 2250, 2500, 2750, 3000, or 3300.

Absorption of an aqueous liquid by a crosslinked graft copolymer as comprised in a composition herein can be optionally gauged by measuring centrifugal retention capacity (CRC) as disclosed in Example 8 below or in U.S. Pat. No. 8,859,758 (incorporated herein by reference), for example. A CRC value herein can be provided in terms of grams of aqueous fluid per grams of crosslinked graft copolymer ("g/g"). A crosslinked graft copolymer can have a CRC of about, or at least about, 6, 7, 8, 9, 10, 11, 12, 13, 14, 15, 16, 17, 18, 19, 20, 21, 22, 23, 24, 25, 26, 27, 28, 29, 30, 31, 32, 33, 28-33, 28-32, 20-25, 21-24, or 22-24 g/g in some embodiments. A corresponding WRV can be made by multiplying a CRC measurement by 100, if desired. Further yet, absorption herein can optionally be measured by determining absorption under load (AUL), such as via the methodology disclosed in U.S. Pat. No. 8,859,758 or EDANA (European Disposables and Non-woven Association) standard test WSP 242.2.R3 (12), which are both incorporated herein by reference. AUL measurements can be provided in terms of grams of aqueous fluid per grams of crosslinked graft copolymer ("g/g"), and can be measured under a suitable pressure (e.g., psi of about 0.5-1.0, 0.75-1.0, 0.80-0.85, or 0.82).

The absorbency of a crosslinked graft copolymer is contemplated in most or all aspects to be greater than the absorbency of the graft copolymer as it existed before being crosslinking to form the crosslinked graft copolymer. For example, the absorbency of a crosslinked graft copolymer can be at least about 2, 3, 4, 5, 6, 7, or 8 times greater than the absorbency of the graft copolymer as it existed before being crosslinking.

Absorption herein can optionally be characterized in terms of the maximum amount of aqueous liquid that can be soaked into and retained by a certain amount of crosslinked graft copolymer. A crosslinked graft copolymer with an absorption capacity of at least 15, 20 or 15-20 g (gram) aqueous liquid/g crosslinked graft copolymer can be characterized as being superabsorbent in some aspects.

A composition comprising a crosslinked graft copolymer as presently disclosed can be in the form of, or comprised within, a personal care product, household product, medical product, or industrial product, for example. In this context, compositions in certain embodiments can be used as absorbent or superabsorbent materials, depending on the degree of absorption exhibited by the constituent crosslinked graft copolymer. A personal care product, household product, medical product, or industrial product herein is optionally designed, at least in part, for handling aqueous liquid absorption.

Examples of personal care products and/or uses herein include absorbent personal hygiene products such as baby diapers, potty training pants/liners, incontinence products (e.g., pads, adult diapers), and feminine hygiene products (e.g., sanitary napkins/pads, tampons, interlabial products, panty liners). Thus, a personal care product in some aspects can be characterized as a personal care absorbent article that can be placed against or near the skin to absorb and contain a fluid discharged or emitted from the body. Examples of personal care products that can be adapted accordingly to take advantage of the absorbency of a crosslinked graft copolymer herein (e.g., replace or supplement originally used absorbent material in a product) are disclosed in WO1999/037261; U.S. Patent Appl. Publ. Nos. 2004/0167491, 2009/0204091, 2001/0014797, 2013/0281949, 2002/0087138, 2010/0241098, 2011/0137277 and 2007/0287971; and U.S. Pat. Nos. 4,623,339, 2,627,858, 3,585,998, 3,964,486, 6,579,273, 6,183,456, 5,820,619, 4,846,824, 4,397,644, 4,079,739, 8,987,543, 4,781,713, 5,462,539, 8,912,383, 3,749,094, 3,322,123, 4,762,521 and 5,342,343, all of which patent application and patent publications are incorporated herein by reference.

Examples of industrial products and/or uses herein include cable wrappings (e.g., wrappings for power or telecommunication cables); food pads; agricultural and forestry applications such as for retaining water in soil and/or to release water to plant roots; fire-fighting devices; and cleanup of acidic or basic aqueous solutions spills. Examples of industrial products that can be adapted accordingly to take advantage of the absorbency of a crosslinked graft copolymer herein are disclosed in U.S. Patent Appl. Publ. Nos. 2002/0147483, 2006/0172048, 20050008737, 2008/0199577, 2012/0328723 and 2004/0074271; and U.S. Pat. Nos. 5,906,952, 7,567,739, 5,176,930, 6,695,138, 4,865,855, 7,459,501, 5,456,733, 9,089,730, 5,849,210, 7,670,513, 7,670,513, 5,683,813, 5,342,543, 4,840,734 and 4,894,179, all of which patent application and patent publications are incorporated herein by reference.

Examples of medical products and/or uses herein include wound healing dressings such as bandages and surgical pads; hospital bed sheets; sanitary towels; controlled drug release devices; cell immobilization islets; three-dimensional cell culture substrates; bioactive scaffolds for regenerative medicine; stomach bulking devices; and disposal of controlled drugs. Examples of medical products that can be adapted accordingly to take advantage of the absorbency of a crosslinked graft copolymer herein are disclosed in WO1998/046159; U.S. Patent Appl. Publ. Nos. 2005/0256486, 20030070232 and 20040128764; and U.S. Pat. Nos. 6,191,341, 7,732,657, 4,925,453, 9,161,860, 3,187,747 and 5,701,617, all of which patent application and patent publications are incorporated herein by reference.

Personal care products, household products, and/or medical products in some embodiments herein can absorb a bodily fluid such as urine, blood, blood serum, liquid fecal matter (e.g., diarrhea), bile, stomach acid/juice, vomit, amniotic fluid, breast milk, cerebrospinal fluid, exudate, lymph, mucus (e.g., nasal drainage, phlegm), peritoneal fluid, pleural fluid, pus, rheum, saliva, sputum, synovial fluid, sweat, and/or tears.

A composition as presently disclosed can comprise about, or at least about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99, 99.5, or 99.9 wt %, for example, of one or more crosslinked graft copolymers herein. Dry compositions in certain aspects can be in the form of powder, granules, microcapsules, flakes, or any other form of particulate matter. Other examples include larger compositions such as pellets, bars, kernels, beads, tablets, sticks, or other agglomerates. A dry composition herein typically has less than 3, 2, 1, 0.5, or 0.1 wt % water comprised therein.

An absorption method is presently disclosed that comprises, at least, contacting a crosslinked graft copolymer herein with an aqueous liquid-comprising composition, wherein the composition absorbs aqueous liquid from the liquid-comprising composition.

An aqueous liquid-comprising composition can be any as disclosed herein. For example, such a composition can be urine, blood, blood serum, liquid fecal matter, bile, stomach acid/juice, vomit, amniotic fluid, breast milk, cerebrospinal fluid, exudate, lymph, mucus, peritoneal fluid, pleural fluid, pus, rheum, saliva, sputum, synovial fluid, sweat, tears, water, or saline.

In certain alternative embodiments, a composition can comprise a very large dextran (very high molecular weight dextran) that has been crosslinked. It is believed that most or all of the conditions disclosed herein for crosslinking a graft copolymer can be applied to crosslinking any very large dextran (one that is not already comprised in a graft copolymer herein) as disclosed above, in the below Examples, and in U.S. Pat. Appl. Publ. No. 2016/0122445, which is incorporated herein by reference. It is also believed that a crosslinked very large dextran can be used in any aqueous liquid absorption application (e.g., superabsorbent) or method disclosed herein. Accordingly, any of the features of the present disclosure regarding crosslinking graft copolymers can likewise characterize embodiments in which a very large dextran is crosslinked and utilized, insofar as would be considered suitable by a skilled artisan. For example, insofar as would be considered suitable by a skilled artisan, the term "graft copolymer" as used in the present disclosure can optionally be replaced with the term "very large dextran" or "very high molecular weight dextran". While compositions with a crosslinked very large dextran herein are typically independent from those comprising a crosslinked graft copolymer, some embodiments herein are drawn to compositions comprising both types of crosslinked material (i.e., crosslinked very large dextran and crosslinked graft copolymer).

Non-limiting examples of compositions and methods disclosed herein include:

1. A composition comprising a crosslinked graft copolymer, wherein the graft copolymer portion of the crosslinked graft copolymer comprises: (i) a backbone comprising dextran, and (ii) poly alpha-1,3-glucan side chains comprising at least about 50% alpha-1,3-glucosidic linkages.
2. The composition of embodiment 1, wherein one or more crosslinks of the crosslinked graft copolymer are covalent.
3. The composition of embodiment 1 or 2, wherein one or more crosslinks of the crosslinked graft copolymer comprise phosphorus.
4. The composition of embodiment 3, wherein one or more crosslinks of the crosslinked graft copolymer comprise a phosphodiester bond.
5. The composition of embodiment 1, 2, 3, or 4, wherein the graft copolymer portion of the crosslinked graft copolymer comprises at least about 50 wt % dextran.
6. The composition of embodiment 1, 2, 3, 4, or 5, wherein the dextran has a weight-average molecular weight (Mw) of at least about 100000 Daltons.
7. The composition of embodiment 1, 2, 3, 4, 5, or 6, wherein the poly alpha-1,3-glucan side chains comprise at least about 95% alpha-1,3-glucosidic linkages.
8. The composition of embodiment 1, 2, 3, 4, 5, 6, or 7, wherein the Mw of one or more individual poly alpha-1,3-glucan side chains is at least about 100000 Daltons.
9. The composition of embodiment 1, 2, 3, 4, 5, 6, 7, or 8, wherein the dextran comprises: (i) about 87-93 wt % glucose linked at positions 1 and 6; (ii) about 0.1-1.2 wt % glucose linked at positions 1 and 3; (iii) about 0.1-0.7 wt % glucose linked at positions 1 and 4; (iv) about 7.7-8.6 wt % glucose linked at positions 1, 3 and 6; and (v) about 0.4-1.7 wt % glucose linked at: (a) positions 1, 2 and 6, or (b) positions 1, 4 and 6; wherein the Mw of the dextran is about 50-200 million Daltons.
10. The composition of embodiment 9, wherein the Mw of the dextran is at least about 100 million Daltons.
11. The composition of embodiment 1, 2, 3, 4, 5, 6, 7, 8, 9, or 10, wherein the crosslinked graft copolymer has a centrifugal retention capacity (CRC) of at least about 6 gram (g) aqueous fluid per gram (g) crosslinked graft copolymer.
12. The composition of embodiment 1, 2, 3, 4, 5, 6, 7, 8, 9, 10, or 11, wherein the crosslinked graft copolymer is produced by contacting the graft copolymer portion with a crosslinking agent and a solvent, optionally wherein the crosslinking agent comprises phosphoryl chloride, and/or the solvent is an aqueous solvent.
13. The composition of embodiment 1, 2, 3, 4, 5, 6, 7, 8, 9, 10, 11, or 12, wherein the composition is a personal care product, household care product, medical product, or industrial product.
14. A method of producing a crosslinked graft copolymer (such as in any one of embodiments 1-13), the method comprising: (a) contacting at least a solvent, a crosslinking agent, and a graft copolymer, wherein the graft copolymer comprises: (i) a backbone comprising dextran, and (ii) poly alpha-1,3-glucan side chains comprising at least about 50% alpha-1,3-glucosidic linkages, whereby a crosslinked graft copolymer is produced; and (b) optionally, isolating the crosslinked graft copolymer produced in step (a).
15. The method of embodiment 14, wherein the solvent is aqueous.
16. A composition comprising crosslinked dextran, wherein the dextran comprises: (i) about 87-93 wt % glucose linked at positions 1 and 6; (ii) about 0.1-1.2 wt % glucose linked at positions 1 and 3; (iii) about 0.1-0.7 wt % glucose linked at positions 1 and 4; (iv) about 7.7-8.6 wt % glucose linked at positions 1, 3 and 6; and (v) about 0.4-1.7 wt % glucose linked at: (a) positions 1, 2 and 6, or (b) positions 1, 4 and 6; wherein the weight-average molecular weight (Mw) of the dextran is about 50-200 million Daltons.
17. The composition of embodiment 16, wherein one or more crosslinks of the crosslinked dextran are covalent.
18. The composition of embodiment 16 or 17, wherein one or more crosslinks of the crosslinked dextran comprise phosphorus.
19. The composition of embodiment 18, wherein one or more crosslinks of the crosslinked dextran comprise a phosphodiester bond.
20. The composition of embodiment 16, 17, 18, or 19, wherein the dextran has an Mw of at least about 100 million Daltons.
21. The composition of embodiment 16, 17, 18, 19, or 20, wherein the crosslinked dextran has a centrifugal retention capacity (CRC) of at least about 6 g aqueous fluid per g crosslinked graft copolymer.
22. The composition of embodiment 16, 17, 18, 19, 20, or 21, wherein the crosslinked dextran is produced by contacting the dextran with a crosslinking agent and a solvent, optionally wherein the crosslinking agent comprises phosphoryl chloride, and/or the solvent is an aqueous solvent.
23. The composition of embodiment 16, 17, 18, 19, 20, 21, or 22, wherein the composition is a personal care product, household care product, medical product, or industrial product.
24. A method of producing a crosslinked dextran (such as in any one of embodiments 16-23), the method comprising: (a) contacting at least a solvent, a crosslinking agent, and the dextran of embodiment 16, whereby a crosslinked dextran is produced; and (b) optionally, isolating the crosslinked dextran produced in step (a).
25. The method of embodiment 24, wherein the solvent is aqueous.

EXAMPLES

The present disclosure is further exemplified in the following Examples. It should be understood that these Examples, while indicating certain preferred aspects herein, are given by way of illustration only. From the above discussion and these Examples, one skilled in the art can ascertain the essential characteristics of the disclosed embodiments, and without departing from the spirit and scope thereof, can make various changes and modifications to adapt the disclosed embodiments to various uses and conditions.

Example 1

Poly Alpha-1,3-Glucan Synthesis from High Molecular Weight Dextran Primer

This Example describes synthesis of poly alpha-1,3-glucan with a glucosyltransferase enzyme using commercially available dextran with high weight-average molecular weight (average 150 kDa) as a primer. Graft copolymers comprising a dextran backbone and poly alpha-1,3-glucan side chains were produced.

Two separate poly alpha-1,3-glucan polymerizations were performed with reactions (A and B) comprising water, sucrose (~100 g/L), dextran, and a *Streptococcus salivarius*-based glucosyltransferase enzyme that synthesizes poly alpha-1,3-glucan with all or nearly all alpha-1,3-glucosidic linkages. Examples of glucosyltransferases that can be used in such reactions include those disclosed in U.S. Patent Appl. Publ. No. 2014/0087431, which is incorporated herein by reference (e.g., SEQ ID NO:4 or 8 therein).

Each of reactions A and B was prepared by mixing 940 g (gram) DI (deionized) water, 100 g sucrose (OmniPur Calbiochem 8550; Lot VF20C; FW 342.30), and 1.36 g potassium monophosphate (MW 136.09; Sigma P5379). The pH was measured to be 5.6 using a conductivity meter, and adjusted down to 5.54 using a few drops of 1 N $H_2SO_4$. A 1-mL sample was taken for HPLC time point zero (pre-addition of dextran). Then, 5 g and 10 g of 150-kDa (avg) dextran (Sigma D4876) were added to reactions A and B, respectively. 500-mL of each reaction was loaded into individual flasks.

After mixing each reaction at about 190 RPM to dissolve the added dextran, 1-mL HPLC samples were taken from each reaction for time point zero (post-addition of dextran) analysis. Each reaction was placed into a circulating heater/chiller set to 25° C. and stirring was commenced at 150 rpm. The reactions were allowed to come up to temperature (~24.4° C.) and stirred for about 45 min before enzyme addition. 50 U of glucosyltransferase enzyme was then added to each reaction.

Filtrate samples (i.e., liquid separated from insoluble products) (1 mL) from each of reactions A and B were taken for HPLC at 2 hr and at the end of each reaction (24 hr). The samples were deactivated for HPLC by heat quenching at 90° C. for 10 min. The samples were filtered through 0.45-μm PTFE filters and diluted for HPLC analysis.

Two identical dilutions were made for all of the time-point filtrate samples, with the exception of the 2-hr and 24-hr samples of reaction B. Samples A 2-hr, B 2-hr, and B 24-hr were all very difficult to filter through the 0.45-μm PTFE filters. All the samples were run in duplicate in various HPLC columns.

A whole-reaction sample (50-ml) was taken at 2 hr from each of reactions A and B and suction-filtered as dry as possible through a plastic-disposable filter. Before washing the insoluble products twice with 50 mL of hot water, the filtrate was removed and saved separately. The insoluble polymer samples were saved in glass vials and stored at 10° C. before analyzing by size-exclusion chromatography (SEC) to determine apparent DP (degree of polymerization), true DP, apparent IV (inherent viscosity), and true IV. Excess insoluble polymer from each 2-hr sample was dried in a vacuum oven at 60° C. under nitrogen for 3 days, and weighed to determine percent solids.

Pulling the filtrate from the synthesized polymer with suction took longer than expected, and was likely related to the continued production of insoluble polymer in the filtrate, which still contained sucrose and glucosyltransferase enzyme. Once the filtrate was all collected, a 1-mL sample was taken and deactivated for HPLC (see above), while the remainder was deactivated in a 70-80° C. water bath for 15 minutes, allowed to cool, and then filtered to remove insoluble polymer products.

The filtrate was then placed in dialysis tubing (14 kDa molecular weight cut-off [MWCO]) and dialyzed for 2 days in running water to remove monosaccharides (fructose, glucose) and oligomers (DP 2-7). Some minor solids were formed during dialysis, so the contents were first filtered and then rotary-evaporated (rotovapped) to a liquid concentrate, which was frozen in liquid nitrogen. The frozen concentrate was then lyophilized for 2-3 days, after which the dry solids were weighed and analyzed by SEC.

After 24 hr, the polymer product slurries created in each of reactions A and B were suction-filtered. Each filtrate was saved separately and an HPLC sample was taken. The polymer was washed twice with 500 mL distilled water (room temperature), after which gross water was sucked off leaving a wet cake. The wet cake was weighed and a sample thereof was taken for SEC analysis. A wet cake sample (~5-6 g) was oven-dried (60° C. for 3 days) and the total insoluble polymer product yield was calculated based on initial wet cake weight. The remaining polymer wet cake was frozen for later analysis. The remaining filtrate was deactivated in a 90° C. water bath for 15 min and dialyzed for 2 days in running water as above. The dialysate was filtered, rotovapped to ~80 mL, lyophilized, weighed and submitted for SEC. Per HPLC analysis, monosaccharide and oligomer (DP 2-7) generation was normal and similar between polymerizations A and B. Wet cake samples were dissolved for SEC analysis by shaking in DMSO/2% LiCl for 10 min at room temperature.

Various aspects of the filtrates and insoluble products of reactions A and B are provided in Tables 1-4 below.

TABLE 1

Total Solids Present in Filtrate
Lyophilized Filtrate Solids*

| Reaction | 2 hr | 24 hr |
|---|---|---|
| A | 0.27 g | 3.13 g |
| B | 0.37 g | 4.75 g |

*includes oligomers

TABLE 2

Sucrose and Dextran Conversion

| Reaction | Sucrose Conversion | Dextran Conversion |
|---|---|---|
| A | 99.3% | 73% |
| B | 99.3% | 64% |

TABLE 3

Dextran Recovered in Filtrate
Recovered Dextran

| Reaction/Time point | Mn | Mw | DPw | Mz | Mw/Mn |
|---|---|---|---|---|---|
| A/2 hr | 15196 | 212556 | 1312 | 2644592 | 13.99 |
| A/24 hr | 10195 | 30003 | 185 | 72429 | 2.94 |
| B/2 hr | 15541 | 190473 | 1176 | 1921736 | 12.26 |
| B/24 hr | 11340 | 45326 | 280 | 137362 | 4.00 |
| starting dextran | 20120 | 244127 | 1507 | 1260514 | 12.13 |

TABLE 4

Molecular Weight Profile of Dextran-Poly Alpha-1,3-Glucan Copolymer Products

| | Dextran-Poly Alpha-1,3-Glucan Copolymer | | | | |
|---|---|---|---|---|---|
| Reaction/Time point | Mn (kDa) | Mw (kDa) | DPw | Mz (kDa) | Mw/Mn |
| A/2 hr | 525 | 1156 | 7137 | 1942 | 2.2 |
| A/24 hr | 322 | 1011 | 6244 | 2126 | 3.14 |
| B/2 hr | 465 | 1005 | 6202 | 1765 | 2.16 |
| B/24 hr | 285 | 802 | 4948 | 1764 | 2.81 |

Figure 2:
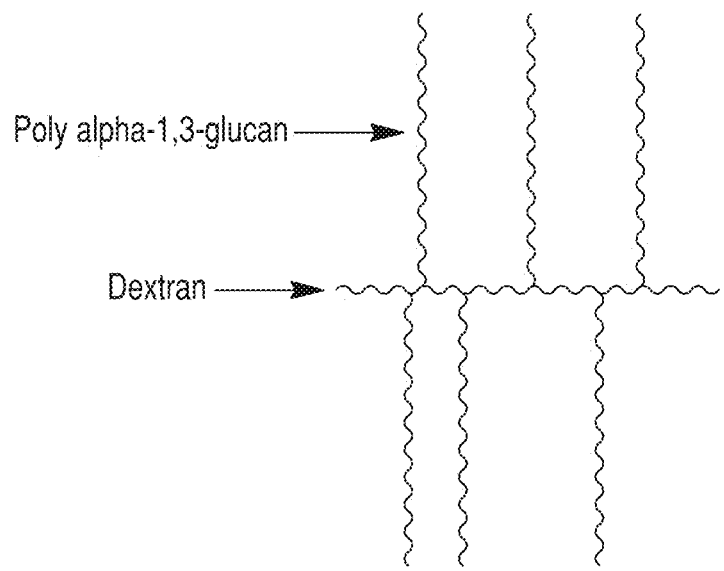

SEC analysis of the starting dextran used in each reaction showed that it was branched. It was estimated that there was a pendant glucose branching from the starting dextran about every 20 monomeric units of the dextran. Each polymerization reaction (24 hr) gave a water-insoluble polymer with a high DPw: ~6000 for reaction A (10 g/L dextran loading) and ~5000 for reaction B (20 g/L dextran loading) (Table 4). Poly alpha-1,3-glucan chains grew off of the dextran branch points, forming a graft copolymer (refer to FIGS. 1 and 2).

Dextranase degradation analyses indicated that the poly alpha-1,3-glucan side chains each had a DPw of roughly 1000. Briefly, dextranase assays were conducted by individually reacting dextran-poly alpha-1,3-glucan graft copolymer products with dextranase in a buffered reaction (pH 5.3-5.7, room temperature, nutation) for about 4 days.

Thus, considering that the starting dextran had a measured DPw of about 1500 (Table 3), and each side chain was about 1000 DPw, there may have been on average about 4-5 poly alpha-1,3-glucan chains on each dextran. Based on this observation, it appears that only a small fraction of the pendant glucose units of the dextran served to prime poly alpha-1,3-glucan side chain synthesis (i.e., there were likely only about 4-5 side chains, whereas it might have been possible to have had about 75 side chains given the presence of a pendant glucose group every 20 monomeric units of the dextran [DPw 1507 divided by 20]).

The molecular weight of dextran recovered in filtrate samples of 24-hr reactions was low, in comparison to the starting dextran molecular weight (Table 3). While one hypothesis was that the dextran may have been degraded by the glucosyltransferase enzyme in the reaction, this was found not to be the case (see Example 3). Thus, it was likely that the dextran was effectively fractionated during the reaction, with higher molecular weight dextran preferentially being used as a substrate for priming poly alpha-1,3-glucan side chain synthesis. Following this scenario, the larger dextran molecules used to prime synthesis of insoluble graft copolymer would have been removed from the soluble pool, leaving behind smaller dextran molecules in reaction filtrates. This observation is intriguing, especially given that other work (WO15/119859) suggested that dextran molecular weight does not play a role in dextran priming of 1,3-glucosidic link-comprising glucan synthesis by glucosyltransferase enzymes.

Thus, graft copolymers comprising a dextran backbone and poly alpha-1,3-glucan side chains were produced. Each of these graft copolymers can optionally be crosslinked following the procedures disclosed in Example 8 below, for example. It is potentially of interest that there were relatively few side chains (4-5), considering that, theoretically, there could have been at least 10-15 times more side chains synthesized. Also, in reactions for preparing this graft copolymer, it appears that high molecular weight dextran, as opposed to lower molecular weight dextran, is preferentially used as a substrate by glucosyltransferases that synthesize glucan comprising mostly alpha-1,3-glucosidic linkages.

Example 2

Controlling the Molecular Weight and Polydispersity of Dextran-Poly Alpha-1,3-Glucan Graft Copolymer Products of a Glucosyltransferase Enzyme Reaction This Example is in addition to Example 1, which together demonstrate, for example, that the molecular weight and polydispersity of dextran-poly alpha-1,3-glucan graft copolymer product can be controlled by modifying the concentration of dextran entered into a glucosyltransferase enzyme reaction.

In general, except as noted below, the procedures described in Example 1 were applied to synthesize and analyzed dextran-poly alpha-1,3-glucan copolymers.

Briefly, two 500-mL glucan synthesis reactions were run at about 25° C. with 100 g/L sucrose and 100 U/L of an *S. salivarius*-based glucosyltransferase enzyme that synthesizes poly alpha-1,3-glucan with all or nearly all alpha-1,3-glucosidic linkages with stirring at 150 rpm. To set up these reactions, 100 g of sucrose (OmniPur Calbiochem 8550) and 1.36 g of potassium monophosphate (Sigma P5379) were dissolved in 940 g tap water and adjusted to pH 5.5 with NaOH. A 1-mL sample (t=0) was taken for HPLC analysis after which the solution was divided in two 500-mL portions. Flasks for reactions A and B were each charged with 500 mL of the sucrose solution and 1.25 g or 2.5 g, respectively, of 150-kDa (avg) dextran (Sigma D4876). HPLC (t=0) samples were taken after which the glucosyltransferase enzyme was added.

At 2 hr post enzyme addition, 50-mL samples (reaction solution and insoluble product) were taken from each of reactions A and B and suction-filtered. The filtrates were saved; 1 mL of each filtrate was removed for HPLC (t=2 hr). The insoluble polymer products were washed twice with 50 mL hot water and analyzed by SEC. The filtrates were deactivated in an 80° C. water bath for 15 min, refiltered and dialyzed (14 kDa MWCO) for 18 days in running water to remove monosaccharides (fructose, glucose) and oligomers (DP 2-7).

At 24 hr post enzyme addition, the polymer product slurries created in each of reactions A and B were heated to 65° C. in a circulating bath and stirred for 1 hr to deactivate the enzyme. The slurries were then suction-filtered; each filtrate was saved and a 1-mL sample (t=24 hr) was taken for HPLC analysis. The polymer was washed, after which gross water was sucked off leaving a wet cake. The wet cake was weighed and a sample thereof was taken for SEC analysis. A wet cake sample was oven-dried (60° C. for 3 days) and the total insoluble polymer product yield was calculated based on initial wet cake weight. The remaining polymer wet cake was frozen for later analysis. The filtrate was dialyzed for 17 days in running water as above. The dialysate was filtered, rotovapped to ~80 mL, lyophilized, weighed and submitted for SEC. Per HPLC analysis, monosaccharide and oligomer (DP 2-7) generation was normal and similar between polymerizations A and B.

Various aspects of the filtrates and insoluble products of reactions A and B of this Example are provided in Tables 5-7 below.

TABLE 5

Total Solids Present in Filtrate
Lyophilized Filtrate Solids*

| Reaction | 2 hr | 24 hr |
|---|---|---|
| A | 0.057 g | 0.086 g |
| B | 0.099 g | 0.322 g |

*monosaccharides and oligomers removed

TABLE 6

Sucrose and Dextran Conversion

| Reaction | Sucrose Conversion | Mass Balance | Dextran Conversion |
|---|---|---|---|
| A | 99.3% | 98.2% | 92% |
| B | 99.4% | 99.0% | 86% |

TABLE 7

Molecular Weight Profile of Dextran-Poly Alpha-1,3-Glucan Copolymer Products

| Reaction | Time point | Starting Dextran Concentration | Dextran-Poly Alpha-1,3-Glucan Copolymer | | | | |
|---|---|---|---|---|---|---|---|
| | | | Mn (kDa) | Mw (kDa) | DPw | Mz (kDa) | Mw/Mn |
| A (Example 2) | 24 hr | 2.5 g/L | 261 | 1198 | 7394 | 2520 | 4.59 |
| B (Example 2) | 24 hr | 5 g/L | 301 | 1236 | 7629 | 2518 | 4.10 |
| A (Example 1) | 24 hr | 10 g/L | 322 | 1011 | 6244 | 2126 | 3.14 |
| B (Example 1) | 24 hr | 20 g/L | 285 | 802 | 4948 | 1764 | 2.81 |
| A(Example 2) | 2 hr | 2.5 g/L | 177 | 1762 | 10873 | 2814 | 9.96 |
| B(Example 2) | 2 hr | 5 g/L | 259 | 1499 | 9255 | 2555 | 5.78 |
| A (Example 1) | 2 hr | 10 g/L | 525 | 1156 | 7137 | 1942 | 2.2 |
| B (Example 1) | 2 hr | 20 g/L | 465 | 1005 | 6202 | 1765 | 2.16 |

Each polymerization reaction after 24 hr in this Example produced water-insoluble polymer with a high DPw of about 7500 (Table 7). The polydispersities (Mw/Mn) of the insoluble polymer products were relatively high, especially for reactions with less starting dextran (Table 7), suggesting there is poly alpha-1,3-glucan homopolymer present in the insoluble products in addition to dextran-poly alpha-1,3-glucan graft copolymer. Such a result was to be expected in a system starved for dextran; indeed, reactions with higher amounts of starting dextran (Example 1) yielded products with lower polydispersity (Table 7). It thus appears that the polydispersity of a dextran-poly alpha-1,3-glucan graft copolymer produced herein can be controlled as a function of the level of dextran entered into a glucosyltransferase reaction.

Figure 3:
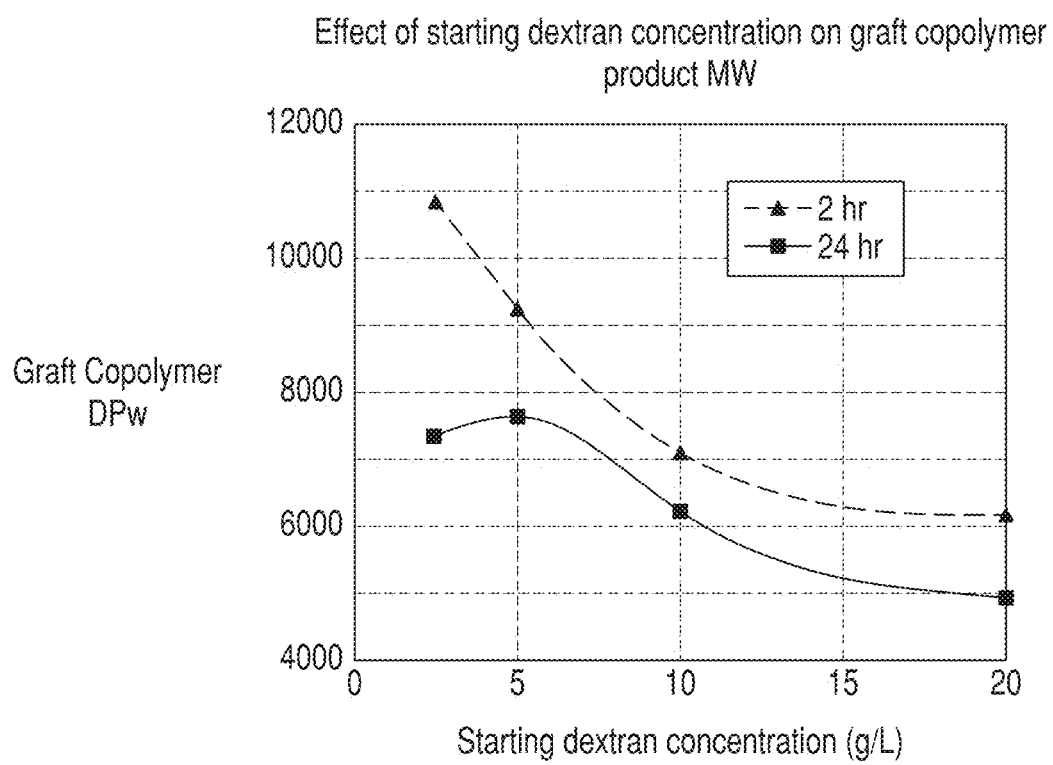

FIG. 3 shows, for 24-hr reactions in which most of the starting dextran has been consumed, the relationship between starting dextran concentration and DPw of the dextran-poly alpha-1,3-glucan graft copolymer product formed. Homopolymerization of poly alpha-1,3-glucan alone competes with dextran priming at low dextran concentrations, while each of the dextran chains gets fewer glucan grafts at higher dextran concentrations. The maximum graft copolymer molecular weight, appears to be produced when using 5 g/L dextran (FIG. 3, Table 7) in a reaction having 100 g/L sucrose and 100 U/L glucosyltransferase enzyme. It thus appears that the molecular weight of a dextran-poly alpha-1,3-glucan graft copolymer produced herein can be controlled as a function of the level of dextran entered into a glucosyltransferase reaction.

Thus, graft copolymers comprising a dextran backbone and poly alpha-1,3-glucan side chains were produced. Each of these graft copolymers can optionally be crosslinked following the procedures disclosed in Example 8 below, for example. Also, the molecular weight and polydispersity of dextran-poly alpha-1,3-glucan copolymer products can be controlled by modifying the concentration of dextran entered into a glucosyltransferase enzyme reaction.

Example 3

Glucosyltransferase Enzyme Activity Does Not Degrade Dextran

This Example demonstrates that the glucosyltransferase used in Examples 1 and 2 to synthesize dextran-poly alpha-1,3-glucan graft copolymer does not degrade dextran. Therefore, the apparent dextran partitioning effect observed in the above reactions was not due to dextran degradation from glucosyltransferase activity.

As described in Example 1, when poly alpha-1,3-glucan synthesis with a glucosyltransferase enzyme is primed with dextran, the recovered unreacted dextran has a significantly lower molecular weight than the dextran which was initially used in the reaction. It was not known whether the dextran was effectively fractionated in the glucosyltransferase reaction—preferentially reacting larger dextran chains to form insoluble dextran-poly alpha-1,3-glucan copolymer, leaving smaller unreacted dextran chains in the reaction solution—or whether the glucosyltransferase enzyme was capable of degrading the dextran.

The purpose of this experiment was to examine if exposing dextran to the glucosyltransferase enzyme used in Examples 1 and 2 under normal reaction conditions, but without sucrose, would lead to dextran degradation. 2.5 g of 150-kDa (avg) dextran (Sigma D4876) and 0.68 g of potassium monophosphate (Sigma P5379) were dissolved in 490 g tap water to provide a solution at pH 5.59. This solution was stirred at 25° C. in a reactor after which 50 U of the glucosyltransferase enzyme was added. The solution was then stirred at 150 rpm for 24 hr and then rotovapped from a hot water bath to leave a damp solid. The solid was taken up in 20 mL of distilled water and the resulting hazy solution was clarified by suction-filtration; a very small amount (~0.1 g) of light brown solids was removed. The filtrate was lyophilized to recover 2.87 g dextran, which was analyzed by SEC and compared with the starting dextran (Table 8).

TABLE 8

Analysis of Dextran Molecular Weight Before and After Exposure to Glucosyltransferase Enzyme

| Dextran | Mn (kDa) | Mp (kDa) | Mw (kDa) | Mz (kDa) | Mw/Mn | DPw |
|---|---|---|---|---|---|---|
| Starting | 60.07 | 83.6 | 258 | 1221 | 4.29 | 1593 |
| Recovered | 58.01 | 83.6 | 249 | 1255 | 4.30 | 1537 |

The results in Table 8 show that the glucosyltransferase enzyme does not degrade dextran under the reaction conditions employed in Examples 1 and 2 (but without sucrose). This result indicates that the enzymatic process of poly alpha-1,3-glucan grafting onto dextran effectively acts to fractionate the dextran based on molecular weight as described above.

Example 4

Poly Alpha-1,3-Glucan Synthesis from Lower Molecular Weight Dextran

This Example describes synthesis of poly alpha-1,3-glucan with a glucosyltransferase enzyme using commercially available dextran primer with a weight-average molecular weight of about 40 kDa.

The purpose of this experiment was to synthesize a dextran-poly alpha-1,3-glucan graft copolymer using dextran having a lower molecular weight than the dextran used in Examples 1 and 2. The dextran used in this experiment has a molecular weight of about 35-45 kDa, which is roughly four times less than the molecular weight of the dextran employed in Examples 1 and 2.

A 1000-mL poly alpha-1,3-glucan polymerization reaction was performed as follows. Sucrose (100 g; OmniPur Calbiochem 8550), dextran (10 g, 35-45 kDa, DPw=220-280, Sigma D1662) and potassium monophosphate (1.36 g, Sigma P5379) were dissolved in 940 g of tap water to give pH 5.67. Stirring at 25° C./150 rpm was then commenced after which 100 U of the glucosyltransferase used in the above Examples was added; stirring at 25° C./150 rpm was continued for 24 hr. After 1.5 hr, a 50-mL insoluble product sample was suction-filtered, washed and suctioned to a damp wet cake (8.7 g) and submitted for SEC analysis. At 24 hr, the insoluble product slurry was suction-filtered and washed three times with 500 mL hot tap water. The gross water was suction-removed and the wet cake was weighed (480 g). Wet cake samples were taken for SEC analysis and percent solids determination (7.6 wt %), the latter of which was done by oven-drying (60° C. for 3 days). The total insoluble dextran-poly alpha-1,3-glucan product yield was calculated based on initial wet cake weight and percent solids. The molecular weight profile of each insoluble product at 1.5 hr and 12 hr was determined (Table 9).

TABLE 9

Molecular Weight Profile of Dextran-Poly Alpha-1,3-Glucan Copolymer Products

| | Dextran-Poly Alpha-1,3-Glucan Copolymer | | | | | |
|---|---|---|---|---|---|---|
| Time point | Mn (kDa) | Mp (kDa) | Mw (kDa) | DPw | Mz (kDa) | Mw/Mn |
| 1.5 hr | 359 | 478 | 593 | 3660 | 946 | 1.65 |
| 24 hr | 210 | 365 | 474 | 2926 | 836 | 2.26 |

Based on measured DPw, it appears that two or at most three poly alpha-1,3-glucan side chains were synthesized on the dextran. This result seems interesting, since dextran (150-kDa avg, Example 1) roughly four times larger than the dextran (40 kDa) used in this Example had about 4-5 poly alpha-1,3-glucan side chains synthesized thereupon (see Example 1). If 2-3 side chains could be synthesized on a 40 kDa dextran, it might have been expected that about 8-12 side chains (instead of 4-5) would have been synthesized on a 150-kDa dextran.

As shown in this Example, dextran of about 40 kDa could be used to prime poly alpha-1,3-glucan side chain synthesis. This result is noteworthy in view of Example 1, which shows that dextran of similar molecular weight did not prime such side chain synthesis when in the presence of larger dextran molecules. The partitioning effect observed in Example 1 (larger dextran preferentially used to prime synthesis of insoluble product, whereas smaller dextran remained in solution) is thus further intriguing, given the results of the present Example showing that smaller molecular weight dextran, when alone, can prime poly alpha-1,3-glucan side chain synthesis. Regardless of these insights, each of the graft copolymers produced in this Example can optionally be crosslinked following the procedures disclosed in Example 8 below, for example.

Example 5

Poly Alpha-1,3-Glucan Polymerization from Very High Molecular Weight Dextran Primer This Example describes synthesis of poly alpha-1,3-glucan with a glucosyltransferase enzyme using dextran with very high weight-average molecular weight (at least 50 million Daltons). Graft copolymer comprising a very large dextran backbone and poly alpha-1,3-glucan side chains was produced.

Dextran with Very High Molecular Weight

Dextran with a very high weight-average molecular weight was first prepared as described in U.S. Appl. Publ. No. 2016/0122445 (Example 9 therein, which employed GTF 0768), which is incorporated herein by reference, but using 300 g/L sucrose (instead of 100 g/L sucrose). The linkage structure of this dextran was believed to be consistent with the linkage structure disclosed in US2016/0122445 (Example 9 therein); Table 10 lists the linkages for samples initially dissolved in DMSO or DMSO/5% LiCl as disclosed in US2016/0122445 (Example 9 therein).

TABLE 10

Linkage Profile of Very High Molecular Weight Dextran

| | Wt %/Mol % of Glucose Monomers in Dextran | | | | |
|---|---|---|---|---|---|
| Sample | 3-glc [a] | 6-glc [b] | 4-glc [c] | 3,6-glc [d] | 2,6- + 4,6-glc [e] |
| DMSO | 0.4 | 90.2 | 0.4 | 8.3 | 0.7 |
| DMSO/5% LiCl | 0.9 | 89.3 | 0.4 | 8.0 | 1.4 |

[a] Glucose monomer linked at carbon positions 1 and 3.
[b] Glucose monomer linked at carbon positions 1 and 6.
[c] Glucose monomer linked at carbon positions 1 and 4.
[d] Glucose monomer linked at carbon positions 1, 3 and 6.
[e] Glucose monomer linked at carbon positions 1, 2 and 6, or 1, 4 and 6.

Based on this information and some other studies (data not shown), it is contemplated that this product is a branched structure in which there are long chains (containing mostly or all alpha-1,6-linkages) of about 20 DP in length (average) that iteratively branch from each other (e.g., a long chain can be a branch from another long chain, which in turn can itself be a branch from another long chain, and so on). The branched structure also appears to comprise short branches from the long chains; these short chains are believed to be 1-3 DP in length and mostly comprise alpha-1,3 and -1,4 linkages, for example. Branch points in the dextran, whether from a long chain branching from another long chain, or a short chain branching from a long chain, appear to comprise alpha-1,3, -1,4, or -1,2 linkages off of a glucose involved in alpha-1,6 linkage. Roughly 25% of all the branch points of the dextran branched into a long chain.

The molecular weight and other size features of the dextran prepared in the present Example were believed to be consistent with the features disclosed in US2016/0122445 (Example 9 therein), which were as follows: a weight-average molecular weight (Mw) of 1.022 (+/−0.025)×$10^8$ g/mol (i.e., roughly 100 million Daltons) (from MALS analysis), a z-average radius of gyration of 243.33 (+/−0.42) nm (from MALS analysis), a z-average hydrodynamic radius of 215 nm (from QELS analysis), and a standard deviation of particle size distribution (PSD) of about 0.259 (from QELS analysis, indicating polydispersity in terms of hydrodynamic size). The very high molecular weight dextran produced in this Example can optionally be used in the procedures described below in Example 9 for preparing crosslinked dextran.

Dextran-Poly Alpha-1,3-Glucan Graft Copolymers Comprising Very High Molecular Weight Dextran The very high weight-average molecular weight dextran prepared above was used in the following enzymatic reaction to prepare dextran-poly alpha-1,3-glucan graft copolymer.

A 500-mL poly alpha-1,3-glucan synthesis reaction was run at 25° C. with stirring at 150 rpm using 100 g/L sucrose, 9.8 g/L dextran and 100 U/L of the glucosyltransferase used in the above Examples. To set up this reaction, dextran (4.9 g) was ground in a mortar and pestle and stirred at 50° C. with 470 g of tap water for 16 hr to give a hazy solution. Then sucrose (50 g, OmniPur Calbiochem 8550) and potassium monophosphate (0.68 g, Sigma P5379) were added and dissolved with stirring to give pH 5.75. The solution was stirred at 25° C. in a reactor, after which the glucosyltransferase enzyme (50 U) was added. In about half an hour, the reaction had become a suspension of firm, spongy particles of about 5 mm in size.

At 2 hr, a 50-mL sample was removed from the reaction (the polymer particles clogged the pipette, so not much insoluble product was obtained). This sample (a suspension) stood for a couple of hours before it was suction-filtered, washed and suctioned to a damp wet cake (1.3 g) and submitted for SEC analysis. The sample was not deactivated to kill enzyme activity, so additional poly alpha-1,3-glucan likely formed before it was suction-filtered. The filtrate was heated to deactivate the enzyme in it. The reaction was continued to 24 hr, after which the insoluble product slurry was suction-filtered; the filtrate (350 mL) was saved and analyzed by HPLC.

The initial filtrate was dialyzed by circulating across a Millipore PELLICON 2 PLCTK regenerated cellulose crossflow membrane (30-kDa cutoff; 0.1 $m^2$) at 100 mL/min and 10 psig. This dialysis served to remove monosaccharides and oligomers (via permeate), and leave unreacted, soluble dextran in the retentate. Deionized water was continuously added to the recirculating feed to replace water lost to permeate; ultimately, 3500 mL of water was used to wash out monosaccharides and oligomers. The retentate was then lyophilized to recover <0.1 g unreacted dextran. These results of only a small amount of soluble dextran in the enzyme reaction indicate that most of the dextran was used to prime poly alpha-1,3-glucan synthesis, thus drawing the dextran to the insoluble products of the reaction.

The insoluble product (dextran-poly alpha-1,3-glucan graft copolymer) of the glucosyltransferase reaction was washed three times with 500 mL of hot tap water; the product consisted of mostly 5-mm particles and a small amount of fines. The gross water was suction-removed and the damp particles were weighed (82.8 g; 24-hr sample); product samples were removed for SEC and percent solids determination. A wet cake sample (1.105 g) was oven-dried (60° C./2 days) for this purpose. The isolated dextran-poly alpha-1,3-glucan graft copolymer comprised about 25% dextran and 75% poly alpha-1,3-glucan.

Dextranase degradation analyses (performed as described in Example 1) indicated that the poly alpha-1,3-glucan side chains of the synthesized copolymer each had a DPw of roughly 1000. This side chain length molecular weight estimate is the same as that observed for side chains synthesized from lower molecular weight dextran (Example 1-2).

Thus, graft copolymer comprising (i) a very large, branched dextran backbone and (ii) poly alpha-1,3-glucan side chains was produced. Such graft copolymer can optionally be crosslinked following the procedures disclosed in Example 8 below, for example.

Example 6

Preparation of Additional Dextran-Poly Alpha-1,3-Glucan Graft Copolymers Comprising Very High Molecular Weight Dextran Additional dextran-poly alpha-1,3-glucan graft copolymers comprising very high molecular weight dextran were prepared in this Example. The very high molecular weight dextran described in Example 5 was used for synthesizing these additional graft copolymers.

Eight glucosyltransferase (100 U/L) reactions were set up and run generally as described in Example 5, but with the following modifications. The reactions were run at 25° C. in 1-L reactions stirred at 150 rpm using helical ribbon stirrers. Table 11 lists the amount of dextran and sucrose entered into each reaction. The pH of the reactions was 5.2-5.8 and left unadjusted. Insoluble product samples were taken at 24 hr after starting the reactions; these samples were worked up by filtering and washing. The resulting wet cakes were weighed and a sample thereof was dried to determine percent solids and yield. Insoluble product samples were analyzed by SEC and NMR. The results of each reaction are summarized in Table 11.

TABLE 11

Properties of Dextran-Poly Alpha-1,3-Glucan Graft Copolymers
Produced in Glucosyltransferase Reactions

| 1-L Reaction | | | Copolymer Product Profile | | |
|---|---|---|---|---|---|
| Dextran (g) | Sucrose (g) | Sucrose Converted (%) | Copolymer Yield (g) | Dextran in Copolymer (wt %) | Copolymer Appearance |
| 5 | 100 | 100 | 40.0 | 10.6 | Stopped stirring; large particles (~5 mm balls), very coarse particulate, no fines, settled |
| 5 | 200 | 100 | 68.8 | 5.9 | Large particles (~4 mm) suspended in fine slurry; mostly granular |
| 2 | 100 | 100 | 38.4 | 4.5 | Stopped stirring; large particles remained suspended |
| 5 | 300 | 69 | 78.9 | 4.1 | Small particles suspended in fine slurry |
| 3 | 200 | 100 | 67.5 | 3.9 | Particles the size of sand grains suspended in fine slurry |
| 3 | 300 | 71 | 84.5 | 2.4 | Large particles (~4 mm) suspended in fine slurry |
| 1 | 200 | 99 | 75.8 | 1.4 | Fine particles; more difficult to filter than above products (rows 1-6) |
| 1 | 300 | 77 | 105.3 | 0.9 | Fine particles; more difficult to filter than above products (rows 1-6) |

Figure 4:
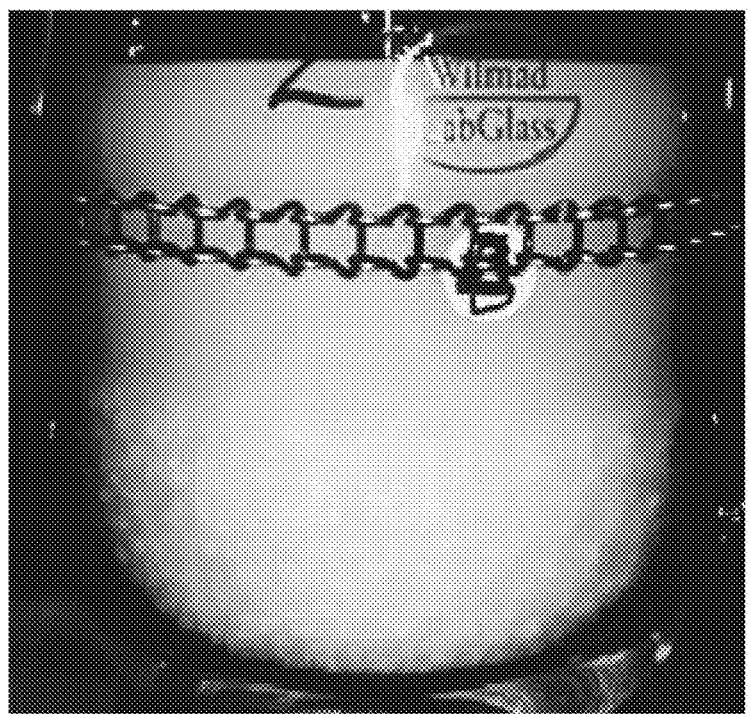
FIG. 4 shows a photograph of a dextran-poly alpha-1,3-glucan graft copolymer sample containing 10.6 wt % dextran. Refer to Example 6.
Figure 5:
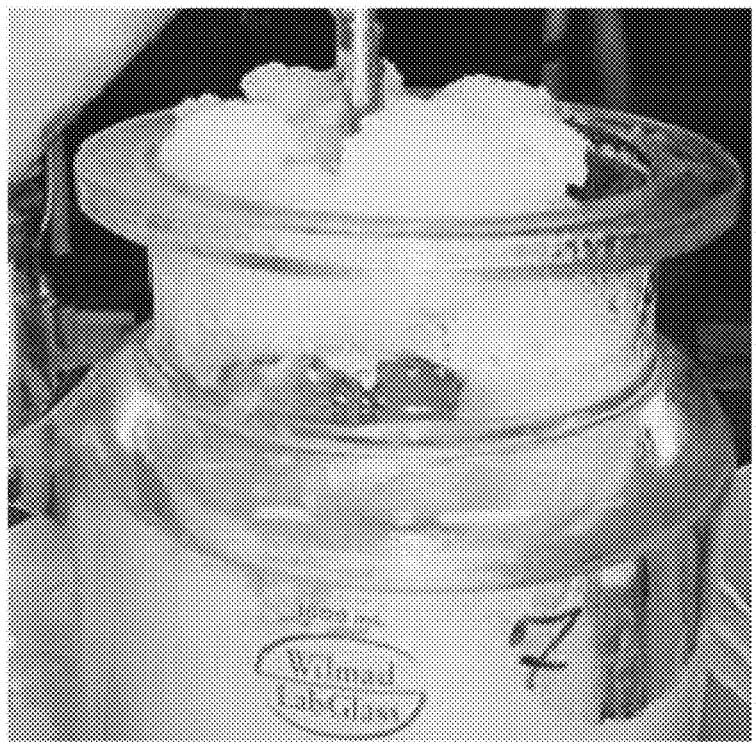
FIG. 5 shows a photograph of a dextran-poly alpha-1,3-glucan graft copolymer sample containing 0.9 wt % dextran. Refer to Example 6.

Overall, graft copolymers with a higher dextran content (e.g., 2.4-10.6 wt %) appeared as larger particles and were more easily filtered compared to their counterparts with lower dextran content (e.g., 0.9-1.4 wt %). FIGS. 4 and 5 show photographs of graft copolymer samples containing 10.6 wt % dextran (Table 11, row 1, more filterable) and 0.9 wt % dextran (Table 11, row 8, less filterable), respectively.

Three more glucosyltransferase (100 U/L) reactions were set up and run generally as described immediately above, using 100 g/L sucrose and dextran at 2, 5, or 10 g/L. These reactions (24 hr) produced dextran-poly alpha-1,3-glucan graft copolymers comprising, respectively, 95%, 87.5%, or 75% alpha-1,3 glucosidic linkages. This product linkage profile is consistent with the products listed in rows 1 and 3 of Table 11, which were made under similar reaction conditions (initial sucrose and dextran levels) (note that the dextran component in each product largely represents alpha-1,6-glucosidic linkages).

Each of the graft copolymers produced in this Example can optionally be crosslinked following the procedures disclosed in Example 8 below, for example.

Example 7

Preparation of Additional Dextran-Poly Alpha-1,3-Glucan Graft Copolymers Comprising Very High Molecular Weight Dextran Yet additional dextran-poly alpha-1,3-glucan graft copolymers comprising very high molecular weight dextran were prepared in this Example.

Three separate enzymatic procedures, described below as processes 76, 77 and 79, were followed to prepare samples of dextran-poly alpha-1,3-glucan graft copolymer. The weight percentage of very high molecular weight dextran in each of these graft copolymers was over 50%.

Process 76

To a 22-liter agitated round-bottom flask were added 1978 g of sucrose, 4831 g of de-ionized (DI) water, and 5.18 g of potassium phosphate monobasic. After the solids dissolved, the pH was adjusted to 6.5. When the batch temperature reached 27° C., 4.8 mL of a cell lysate containing GTF 0768 (U.S. Appl. Publ. No. 2016/0122445) was added to commence polymerization of dextran with very high molecular weight. After 11.8 hours, the reaction was heated to 60° C. and held for 30 minutes to deactivate the GTF enzyme. To this preparation were added 9930 g DI water and 11.8 g of potassium phosphate monobasic. The pH was adjusted to 5.5 and the temperature was stabilized at 33° C. The second polymerization (for synthesis of alpha-1,3-glucan side chains from the very high molecular weight dextran) was then started by adding 42 mL of a cell lysate comprising an *S. salivarius*-based glucosyltransferase enzyme that synthesizes poly alpha-1,3-glucan with all or nearly all alpha-1,3-glucosidic linkages. Immediately after this enzyme addition, a feed of a 56 wt % aqueous sucrose solution was started at a rate of 3.0 mL/min. The sucrose solution was fed for 2 hours and 19 minutes. The reaction was held at 33° C. under agitation for 23.75 hours after stopping the sucrose addition. The reaction was then heated to 60° C. and held for 30 minutes to deactivate the second enzyme, thereby completing synthesis of a dextran-poly alpha-1,3-glucan graft copolymer product. Gravimetric analysis of the final slurry measured 3.1% product. Proton NMR analysis done in deuterated DMSO containing 2% lithium chloride indicated that the graft copolymer product contained 61 wt % of dextran.

Process 77

To a 22-liter agitated round bottom-flask were added 2245 g of sucrose, 5721 g of DI water, and 6.05 g of potassium phosphate monobasic. After the solids dissolved, the pH was adjusted to 6.5. When the batch temperature reached 31° C., 5.6 mL of a cell lysate containing GTF 0768 (U.S. Appl. Publ. No. 2016/0122445) was added to commence polymerization of dextran with very high molecular weight. After 72.9 hours, the reaction was heated to 60° C. and held for 30 minutes to deactivate the GTF enzyme. To this preparation were added 9940 g DI water and 11.8 g of potassium phosphate monobasic. The pH was adjusted to 5.5 and the temperature was stabilized at 33° C. The second polymerization (for synthesis of alpha-1,3-glucan side chains from the very high molecular weight dextran) was then started by adding 42 mL of a cell lysate comprising an *S. salivarius*-based glucosyltransferase enzyme that synthesizes poly alpha-1,3-glucan with all or nearly all alpha-1,3-glucosidic linkages. Immediately after this enzyme addition, a feed of a 56 wt % aqueous sucrose solution was started at a rate of 3.0 mL/min. The sucrose solution was fed for 3 hours and 28 minutes. This was equivalent to adding 431 g of sucrose. The reaction was then heated to 60° C. and held for 15 minutes to deactivate the second enzyme, thereby completing synthesis of a dextran-poly alpha-1,3-glucan graft copolymer product. Proton NMR analysis done in deuterated DMSO containing 2% lithium chloride indicated that the graft copolymer product contained 82 wt % of dextran.

Process 79

To a 2-liter agitated and jacketed resin vessel were added 295 g of sucrose, 721 g of DI water, and 0.77 g of potassium phosphate monobasic. After the solids dissolved, the pH was adjusted to 6.5. When the batch temperature reached 27° C., 0.72 mL of a cell lysate containing GTF 0768 (U.S. Appl. Publ. No. 2016/0122445) was added to commence polymerization of dextran with very high molecular weight. After 71.8 hours, the reaction was heated to 60° C. and held for 15 minutes to deactivate the GTF enzyme. To this preparation were added 1516 g DI water and 1.80 g of potassium phosphate monobasic. The pH was adjusted to 5.5 and the temperature was stabilized at 33° C. The second polymerization (for synthesis of alpha-1,3-glucan side chains from the very high molecular weight dextran) was then started by adding 6 mL of a cell lysate comprising an *S. salivarius*-based glucosyltransferase enzyme that synthesizes poly alpha-1,3-glucan with all or nearly all alpha-1,3-glucosidic linkages. Immediately after this enzyme addition, a feed of a 56 wt % aqueous sucrose solution was started at a rate of 41.4 mL/hr. A total of 62.5 mL of the aqueous sucrose solution was added. This was equivalent to adding 44.1 g of sucrose. The reaction was held at 33° C. for 17.6 hours and then heated to 60° C. and held for 15 minutes to deactivate the second enzyme, thereby completing synthesis of a dextran-poly alpha-1,3-glucan graft copolymer product. Proton NMR analysis done in deuterated DMSO containing 2% lithium chloride indicated that the graft copolymer product contained 90 wt % of dextran.

Thus, additional samples of dextran-poly alpha-1,3-glucan graft copolymers were prepared following the above procedures. Each of these graft copolymers was separately used in Example 8 below to prepare crosslinked graft copolymers.

Example 8

Preparation of Crosslinked Graft Copolymers for Aqueous Liquid Absorption Applications This Example describes crosslinking dextran-poly alpha-1,3-glucan graft copolymers to yield crosslinked graft copolymers. These crosslinked graft copolymers exhibited enhanced absorption of aqueous liquids compared to their non-crosslinked counterparts.

Crosslinking Reaction

Individual crosslinking reactions were performed following the below protocol using dextran-poly alpha-1,3-glucan graft copolymers produced in process 76 (graft copolymer with 61 wt % dextran), process 77 (graft copolymer with 82 wt % dextran), or process 79 (graft copolymer with 90 wt % dextran) of Example 7. For ease of discussion below, these graft copolymers will be referred to their respective synthesis process number (76, 77, or 79).

1. About 5 g (process-76) or 10 g (process-77 or -79) of graft copolymer was hydrated in about 45 or 90 g of DI water, respectively, resulting in a mixture comprising about 10 wt % graft copolymer.
2. NaOH solution (50 wt %) was added to the mixture (12 g NaOH for 5 g graft copolymer, 24 g NaOH for 10 g graft copolymer).
3. The mixture was stirred on a shake table for 30 minutes, during which time the graft copolymer dissolved and the viscosity increased. The color of the resulting solution was amber.
4. Two aliquots of freshly distilled phosphoryl chloride (POCl$_3$) were slowly added to the solution with vigorous stirring, such that the final concentration of POCl$_3$ was 1.6 wt %, thereby providing a crosslinking reaction. The crosslinking reaction comprising process-76 graft copolymer thickened to such an extent that it was necessary to add DI water to allow stirring to continue during and after POCl$_3$ addition.
5. The reaction was stirred for 1 hour, during which time it gelled. Then, it was filtered and washed to near neutral conditions (with HCl adjustment as required) until NaCl could not be detected using AgNO$_3$.
6. The crosslinked graft copolymer product was dried in an 80° C. vacuum oven with a nitrogen flush for about 60 hours. The resulting materials for each crosslinking reaction were brittle; each product was ground in a small coffee grinder and stored.

Thus, crosslinked dextran-poly alpha-1,3-glucan graft copolymers were produced (referred to below as crosslinked process-76, -77, or -79 graft copolymer). The product yields for the crosslinked process-76, -77 and -79 graft copolymers were measured to be 95%, 31% and 38%, respectively.

Centrifugal Retention Capacity (CRC) Evaluation

Each crosslinked graft copolymer, as well as its respective non-crosslinked counterpart, was tested for aqueous liquid absorption ability via CRC evaluation as follows.

Polysaccharide (crosslinked or non-crosslinked graft copolymer) (200 mg) was heat-sealed into a weighed 50 mm×80 mm teabag and soaked in DI water or a 0.9-wt % NaCl solution for 30 minutes. The NaCl solution was used to simulate urine. The teabag was then placed in a basket centrifuge and spun at 1878 rpm for 3 minutes. The weights of the teabag, dry polysaccharide, and liquid retained by the teabag were determined accordingly. The basket CRC (g liquid retained per g dry polymer) was calculated using the following equation:

$$[(\text{weight of teabag and polymer post centrifuge})-(3\times \text{weight of dry teabag*}+\text{weight of dry polymer})]/\text{weight of dry polymer.}$$

*Since the teabag picks up additional liquid that could skew the results, a correction factor of 3-times the teabag weight was determined experimentally and applied accordingly in the above formula.

Certain Observations

- Each of the crosslinked process-76, -77 and -79 graft copolymers hydrated very well.
- During washing, each of the crosslinked process-76, -77 and -79 graft copolymers swelled a significant amount. This was an encouraging sign indicating that crosslinking had occurred with improvements in water absorption.
- CRC evaluation results are reported below in Table 12 (data represent average of two repeats). In general, each crosslinked graft copolymer exhibited higher aqueous liquid absorption compared to its respective non-crosslinked counterpart. It is noted that the crosslinking reaction for process-76 graft copolymer required a significant amount of added DI water during POCl₃ addition to enable adequate stirring. This higher dilution likely accounts for why this crosslinked graft copolymer exhibited a lower absorption profile compared to crosslinked process-77 and -79 graft copolymers.

TABLE 12

Absorption of Aqueous Liquid by Dextran-Poly Alpha-1,3-Glucan Graft Copolymers (Crosslinked vs. Non-Crosslinked)

| Sample | | CRC (g/g) | |
|---|---|---|---|
| | | DI Water | 0.9-wt % NaCl |
| Process-76 graft copolymer | Non-crosslinked | 5.543 | 5.57 |
| | Crosslinked | 10.914 | 6.04 |
| Process-77 graft copolymer | Non-crosslinked | 4.085 | 4 |
| | Crosslinked | 29.116 | 9.41 |
| Process-79 graft copolymer | Non-crosslinked | 6.188 | 6.04 |
| | Crosslinked | 32.527 | 10.86 |

Thus, crosslinked graft copolymers herein exhibit enhanced absorption of aqueous liquids compared to their non-crosslinked counterparts. Given this activity, it is contemplated that crosslinked dextran-poly alpha-1,3-glucan graft copolymers are suitable for use in various aqueous liquid absorption applications as disclosed above.

Example 9

Preparation of Crosslinked Very High Molecular Weight Dextran for Aqueous Liquid Absorption Applications This Example describes crosslinking very high molecular weight dextran ("very large dextran") using various crosslinking agents.

The dextran samples used in all the crosslinking studies in this Example were produced using enzyme GTF 0768 (U.S. Appl. Publ. No. 2016/0122445), as disclosed above in Examples 5 and 7, for example. CRC measurements were made following the procedure described above in Example 8. Absorption under load (AUL) measurements were made following the procedure disclosed in EDANA standard test WSP 242.2.R3 (12), which is incorporated herein by reference.

Crosslinking with Phosphoryl Chloride (POCl₃)

Very high molecular weight dextran (2.5 g) was added to water (22.5 g) portion by portion with stirring. The solution was slowly stirred to homogeneity. Sodium hydroxide solution (6 g, Fisher Scientific, 50%) was then added. The resulting preparation was slowly stirred at room temperature for 30 minutes. POCl₃ (0.4 g, Aldrich, fresh-distilled, bp 106-107° C.) was then added in two portions. The resulting preparation was vigorously stirred with a glass rod for about 20 minutes. The resulting gel was set at room temperature overnight, then thoroughly washed with water to near neutral pH, and dried on a lyophilizer to provide a white solid. Thus, crosslinked very high molecular weight dextran was produced.

AUL and CRC measurements of the product were then taken using a 0.9% NaCl solution as the liquid being absorbed. The crosslinked very high molecular weight dextran was measured to have an AUL of 17.3 g/g under a psi (pounds-per-square inch) of 0.82, and a CRC of 23.1 g/g.

Crosslinking with Sodium Trimetaphosphate (STMP)

Very high molecular weight dextran (5 g) was dissolved in 50 mL water in a flask with a mechanical stirrer. Sodium hydroxide solution (10%, 1 g) was then added while stirring at about 159 rpm. An STMP solution (2.0 g of STMP in 10 mL DI water) was then added to the stirring preparation. After 1 hour of stirring, another 1.0 g of NaOH (10%) solution was added dropwise. Again, after another hour elapsed, 1.0 g of NaOH (10%) solution was added dropwise. The stirring was adjusted to 51 rpm and continued overnight. The resulting material was washed with copious amounts of water to a neutral pH, then dried under vacuum to give a white solid. Thus, crosslinked very high molecular weight dextran was produced.

AUL and CRC measurements of the product were then taken using a 0.9% NaCl solution as the liquid being absorbed. The crosslinked very high molecular weight dextran was measured to have an AUL of 13.3 g/g under a psi of 0.82, and a CRC of 12.2 g/g.

Crosslinking with Citric Acid

Very high molecular weight dextran (5.6 g) was added to water (48.5 g) portion by portion with stirring. The preparation was slowly stirred until a homogeneous viscous solution was formed. Citric acid (1.0 g) was then added, after which the preparation was dried in a vacuum oven at 60° C. over 3 days. Water (5 mL) was added and the resulting preparation was stirred at room temperature for 6 hours to provide a viscous preparation. This preparation was lyophilized to provide a white solid. Thus, crosslinked very high molecular weight dextran was produced.

AUL and CRC measurements of the product were then taken using a 0.9% NaCl solution as the liquid being absorbed. The crosslinked very high molecular weight dextran was measured to have an AUL of 7.1 g/g under a psi of 0.82, and a CRC of 9.5 g/g.

Crosslinking with Boric Acid

Boric acid (0.16 g) was dissolved in water (5 mL), after which NaOH solution (2%, about 2.5 mL) was added to adjust the pH to about 10. More water was then added to bring the total solution volume to 14 mL. Very high molecular weight dextran (0.97 g) was added to this solution portion by portion with stirring. The preparation was allowed to set at room temperature overnight, and then dried by lyophilization to provide a solid. Thus, crosslinked very high molecular weight dextran was produced.

AUL and CRC measurements of the product were then taken using a 0.9% NaCl solution as the liquid being absorbed. The crosslinked very high molecular weight dextran was measured to have an AUL of 14.2 g/g under a psi of 0.82, and a CRC of 17.2 g/g.

Crosslinking with Epichlorohydrin (ECH)

Very high molecular weight dextran (2.5 g) was added to water (17.5 g) portion by portion with stirring. The solution was slowly stirred until a homogeneous gel was formed. Sodium hydroxide solution (10%, 10 g) and water 5 g were then added, after which ECH (0.84 g) was added. This preparation was stirred at room temperature. The resulting gel was washed with water to near neutral pH. The washed gel was dried by lyophilization to provide a solid. Thus, crosslinked very high molecular weight dextran was produced.

AUL and CRC measurements of the product were then taken using a 0.9% NaCl solution as the liquid being absorbed. The crosslinked very high molecular weight dextran was measured to have an AUL of 15.4 g/g under a psi of 0.82, and a CRC of 10.1 g/g.

Crosslinking with Divinyl Sulfone (DVS)

Very high molecular weight dextran (5.0 g) was added to 50 g of water and 2.5 g of NaOH solution (2 wt %). This preparation was stirred overnight, after which DVS (0.225 g) in 4.5 g water was added with stirring. The viscosity of the preparation increased very rapidly after the addition of DVS. The preparation was allowed to set at room temperature over 3 days, after which it was washed with water to near neutral pH, and then dried by lyophilization to provide a solid. Thus, crosslinked very high molecular weight dextran was produced.

AUL and CRC measurements of the product were then taken using a 0.9% NaCl solution as the liquid being absorbed. The crosslinked very high molecular weight dextran was measured to have an AUL of 13 g/g under a psi of 0.82, and a CRC of 10.6 g/g.

Thus, very high molecular weight dextran was crosslinked using different crosslinking agents. Each of these crosslinked dextran materials exhibited absorption of aqueous liquid, and are therefore contemplated to be suitable for use in various aqueous liquid absorption applications as disclosed above.

What is claimed is:

1. A composition comprising a crosslinked graft copolymer,
wherein the graft copolymer portion of the crosslinked graft copolymer comprises:
(i) a backbone comprising dextran, and
(ii) poly alpha-1,3-glucan side chains comprising at least 50% alpha-1,3-glucosidic linkages;
wherein one or more crosslinks of the crosslinked graft copolymer are covalent.

2. The composition of claim 1, wherein one or more crosslinks of the crosslinked graft copolymer comprise phosphorus.

3. The composition of claim 2, wherein one or more crosslinks of the crosslinked graft copolymer comprise a phosphodiester bond.

4. The composition of claim 1, wherein the graft copolymer portion of the crosslinked graft copolymer comprises at least 50 wt % dextran.

5. The composition of claim 1, wherein the dextran has a weight-average molecular weight (Mw) of at least 100000 Daltons.

6. The composition of claim 1, wherein the poly alpha-1,3-glucan side chains comprise at least 95% alpha-1,3-glucosidic linkages.

7. The composition of claim 1, wherein the molecular weight of one or more individual poly alpha-1,3-glucan side chains is at least 100000 Daltons.

8. The composition of claim 1, wherein the crosslinked graft copolymer has a centrifugal retention capacity (CRC) of at least 6 gram aqueous fluid per gram crosslinked graft copolymer.

9. The composition of claim 1, wherein the composition is a personal care product, household care product, medical product, or industrial product.

10. A method of producing a crosslinked graft copolymer, said method comprising:
contacting at least a solvent, a crosslinking agent, and a graft copolymer,
wherein the graft copolymer comprises:
(i) a backbone comprising dextran, and
(ii) poly alpha-1,3-glucan side chains comprising at least 50% alpha-1,3-glucosidic linkages,
whereby a crosslinked graft copolymer is produced having one or more crosslinks that are covalent.

11. The method of claim 10, wherein the solvent is aqueous.

12. The composition of claim 5, wherein the dextran has an Mw of at least 10 million Daltons.

13. The composition of claim 12, wherein the dextran has an Mw of at least 50 million Daltons.

14. The composition of claim 13, wherein the dextran has an Mw of at least 100 million Daltons.

15. The composition of claim 1, wherein the dextran comprises at least 85% alpha-1,6-glucosidic linkages.

16. The composition of claim 1, wherein the poly alpha-1,3-glucan side chains comprise at least 85% alpha-1,3-glucosidic linkages.

17. The composition of claim 1, wherein the composition is a product selected from the group consisting of baby diapers, potty training pants, incontinence products, feminine hygiene products, wound healing dressings, and sanitary towels.

18. The composition of claim 1, wherein the composition is a product selected from the group consisting of (i) telecommunication cable wrapping, (ii) food pad, (iii) firefighting device, (iv) product for cleanup of acidic or basic aqueous solutions spills, and (v) agricultural or forestry product for retaining water in soil and/or to release water to plant roots.

19. The method of claim 10, further comprising isolating the crosslinked graft copolymer.

* * * * *